US011595353B2

(12) United States Patent　　　　(10) Patent No.: US 11,595,353 B2
Everton　　　　　　　　　　　　　　(45) Date of Patent: *Feb. 28, 2023

(54) IDENTITY-BASED MESSAGING SECURITY

(71) Applicant: Mimecast North America, Inc., Lexington, MA (US)

(72) Inventor: Paul Everton, Chicago, IL (US)

(73) Assignee: Mimecast North America, Inc., Lexington, MA (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/206,474

(22) Filed: Mar. 19, 2021

(65) Prior Publication Data
US 2021/0211410 A1　　Jul. 8, 2021

Related U.S. Application Data

(63) Continuation of application No. 16/214,716, filed on Dec. 10, 2018, now Pat. No. 10,979,393, which is a
(Continued)

(51) Int. Cl.
*H04L 29/06*　　(2006.01)
*H04L 9/40*　　(2022.01)
(Continued)

(52) U.S. Cl.
CPC ...... *H04L 63/0245* (2013.01); *G06F 16/2379* (2019.01); *H04L 51/212* (2022.05); *H04L 51/42* (2022.05)

(58) Field of Classification Search
CPC ............. H04L 63/0245; H04L 63/1408; H04L 63/1466; G06F 16/2379
See application file for complete search history.

(56) References Cited

U.S. PATENT DOCUMENTS 5,771,355 A * 6/1998 Kuzma ................... H04L 12/14
　　　　　　　　　　　　　　　　　　　　　715/205
7,599,852 B2 * 10/2009 Bosarge ............. G06Q 30/0255
　　　　　　　　　　　　　　　　　　　　　705/14.49
(Continued)

FOREIGN PATENT DOCUMENTS

EP　　1227637 A2 *　7/2002　............. H04L 29/06

OTHER PUBLICATIONS

Austin et al., "SimpleScalar: an infrastructure for computer system modeling", Journals & Magazines, Computer, vol. Issue: 2; "https://ieeexplore.ieee.org/stamp/stamp.jsp?arnumber=982917", Feb. 2002.*

*Primary Examiner* — Morshed Mehedi
(74) *Attorney, Agent, or Firm* — Nutter McClennen & Fish LLP

(57) ABSTRACT

A system comprising email processing circuitry, web server circuitry, third-party interface circuitry, and a database, wherein the database stores information about a plurality of users. The system receives, via a network, a first email message and generates a modified first email message by insertion of a link to remotely-hosted content in the received email message. The system transmits, via a network interface, the modified first email message. The system receives, via a network, a request for the remotely-hosted content, and updates the database based on information contained in the request for the remotely-hosted content. The system receives, via a network, information about activity on a third-party system, and updates the database based on the information about activity on the third-party system. The system receives a second email message, determines an action to take on the second email message based on information in the database, and takes the action.

18 Claims, 25 Drawing Sheets

Related U.S. Application Data continuation-in-part of application No. 15/872,078, filed on Jan. 16, 2018, now Pat. No. 10,893,009, and a continuation-in-part of application No. 15/849,806, filed on Dec. 21, 2017, now Pat. No. 10,326,723, and a continuation-in-part of application No. 15/824,100, filed on Nov. 28, 2017, now abandoned, and a continuation-in-part of application No. 15/810,695, filed on Nov. 13, 2017, now Pat. No. 10,096,001, which is a continuation of application No. 15/670,169, filed on Aug. 7, 2017, now Pat. No. 9,824,332, said application No. 16/214,716 is a continuation-in-part of application No. 15/613,343, filed on Jun. 7, 2017, now Pat. No. 10,187,342, and a continuation-in-part of application No. 15/418,275, filed on Jan. 27, 2017, now abandoned, said application No. 15/849,806 is a continuation of application No. 15/378,259, filed on Dec. 14, 2016, now Pat. No. 9,860,202, said application No. 15/613,343 is a continuation of application No. 15/285,797, filed on Oct. 5, 2016, now Pat. No. 9,674,129, said application No. 15/378,259 is a continuation of application No. 14/992,194, filed on Jan. 11, 2016, now Pat. No. 9,559,997.

(60) Provisional application No. 62/484,444, filed on Apr. 12, 2017, provisional application No. 62/459,863, filed on Feb. 16, 2017, provisional application No. 62/442,165, filed on Jan. 4, 2017, provisional application No. 62/289,219, filed on Jan. 30, 2016.

(51) Int. Cl.
*G06F 16/23* (2019.01)
*H04L 51/42* (2022.01)
*H04L 51/212* (2022.01)

(56) References Cited

U.S. PATENT DOCUMENTS

| | | | |
|---|---|---|---|
| 7,865,394 B1 * | 1/2011 | Calloway | G06Q 30/0603 705/14.66 |
| 9,203,650 B2 * | 12/2015 | Malcolm | H04L 63/20 |
| 10,223,340 B2 * | 3/2019 | Soni | G06F 40/197 |
| 2005/0138353 A1 * | 6/2005 | Spies | H04L 63/0442 713/153 |
| 2006/0020799 A1 * | 1/2006 | Kemshall | H04L 51/00 713/170 |
| 2007/0094263 A1 * | 4/2007 | Tessman | H04L 63/123 707/999.009 |
| 2015/0058429 A1 * | 2/2015 | Liu | H04L 51/234 709/206 |

* cited by examiner

| Compose Message | |
|---|---|
| To: [addresses entered here will be put into "To:" message header fields] | 554 |
| Cc: [addresses typed here will be put into "Cc:" message header fields] | 556 |
| Bcc: [addresses typed here will be put into "Bcc:" message header fields] | 558 |
| Subject: [text typed here will be put into "Subject:" message header fields] | 560 |
| [text, images, links, etc. typed here will be put in message body] | 562 |

| | URL/to/interface | | | | | | | | | |
|---|---|---|---|---|---|---|---|---|---|---|
| A@X.COM BLOCKED/MODIFIED MESSAGES REPORT FOR PERIOD 2016/1/1 to 2016/1/7 ||||||||||||
| Date rcvd | Sender | Subject | Reason blocked/ modified | Link to original message/content | About sender | Connectedness score | spam score | Add to Whitelist? | Add to blacklist? | Links to related emails |
| Jan 1, 2016 | F@Z.com | xxxxxx | Tracking | Http://URL1 | "provider of..." | 45/100 | 50/100 | ☐ | ☒ | Http://URL2 Http://URL3 |
| Jan 3, 2016 | L@Q.com | xxxxxx | SPAM | Http://URL4 | No info | 5/100 | 80/100 | ☐ | ☒ | |
| Jan 7, 2016 | I@Y.com | xxxxxx | Custom rule 3 | Http://URL5 | "CMO of Y.com" | 70/100 | 10/100 | ☒ | ☐ | Http://URL6 Http://URL7 |

FIG. 10A

IDENTITY-BASED MESSAGING SECURITY

PRIORITY CLAIM

This application is a continuation of U.S. patent application Ser. No. 16/214,716 filed on Dec. 10, 2018, which is a continuation-in-part of U.S. patent application Ser. No. 15/849,806 filed on Dec. 21, 2017 (now U.S. Pat. No. 10,326,723), which is continuation of U.S. patent application Ser. No. 15/378,259 filed on Dec. 14, 2016 (now U.S. Pat. No. 9,860,202), which is a continuation of U.S. patent application Ser. No. 14/992,194 filed on Jan. 11, 2016 (now U.S. Pat. No. 9,559,997). U.S. patent application Ser. No. 16/214,716 filed on Dec. 10, 2018 is also a continuation-in-part of U.S. patent application Ser. No. 15/418,275 filed on Jan. 27, 2017, which claims the benefit of U.S. Provisional Patent Application 62/289,219 filed on Jan. 30, 2016. U.S. patent application Ser. No. 16/214,716 filed on Dec. 10, 2018 is also a continuation-in-part of U.S. patent application Ser. No. 15/613,343 filed on Jun. 5, 2017 (now U.S. Pat. No. 10,187,342), which is a continuation of U.S. patent application Ser. No. 15/285,797 filed on Oct. 5, 2016. U.S. patent application Ser. No. 16/214,716 filed on Dec. 10, 2018 is also a continuation-in-part of U.S. patent application Ser. No. 15/824,100 filed Nov. 28, 2017, which claims the benefit of U.S. Provisional Patent Application 62/442,165 filed on Jan. 4, 2017. U.S. patent application Ser. No. 16/214,716 filed on Dec. 10, 2018 is also a continuation-in-part of U.S. patent application Ser. No. 15/872,078 filed on Jan. 16, 2018 (now U.S. Pat. No. 10,893,009), which claims the benefit of U.S. Provisional Patent Application 62/459,863 filed on Feb. 16, 2017. U.S. patent application Ser. No. 16/214,716 filed on Dec. 10, 2018 is also a continuation-in-part of U.S. patent application Ser. No. 15/810,695 filed on Nov. 13, 2017 (now U.S. Pat. No. 10,096,001), which is a continuation of U.S. patent application Ser. No. 15/670,169 filed on Aug. 7, 2017 (now U.S. Pat. No. 9,824,332), which claims the benefit of U.S. Provisional Patent Application 62/484,444 filed on Apr. 12, 2017. Each of the above-referenced documents is hereby incorporated herein by reference in its entirety.

BACKGROUND

Limitations and disadvantages of conventional approaches to messaging security will become apparent to one of skill in the art, through comparison of such approaches with some aspects of the present method and system set forth in the remainder of this disclosure with reference to the drawings.

BRIEF SUMMARY

Methods and systems are provided for identity-based messaging security, substantially as illustrated by and/or described in connection with at least one of the figures, as set forth more completely in the claims.

BRIEF DESCRIPTION OF THE DRAWINGS

FIG. 10A illustrates an example interface for managing custom processing of email messages by the custom email handler.

DETAILED DESCRIPTION

Figure 1:
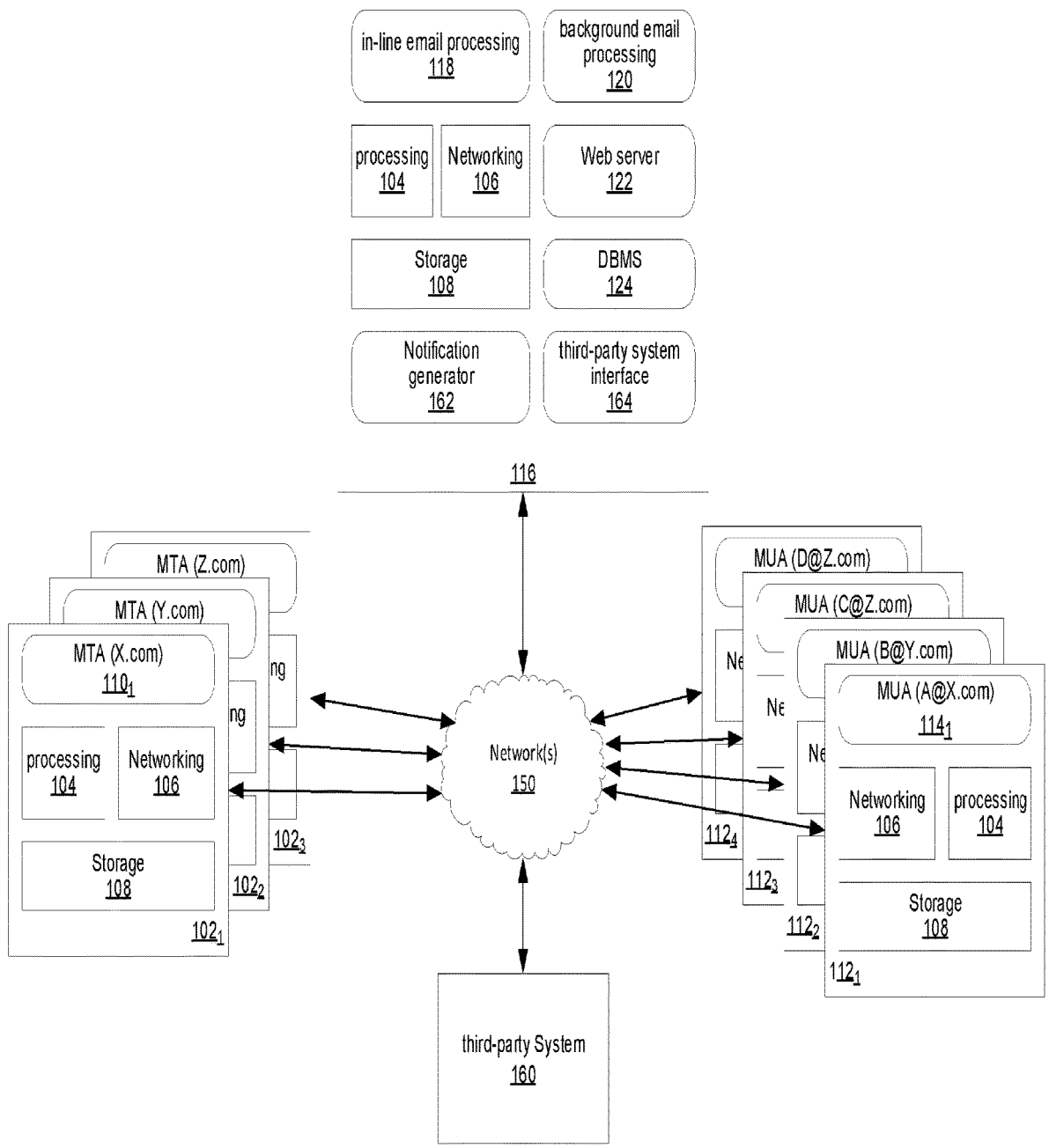
FIG. 1 illustrates an example system configured to provide client agnostic email processing.

FIG. 1 illustrates an example system configured to provide client agnostic email processing. The system comprises a plurality of devices 102 (e.g., servers), a plurality of devices 112 (e.g., desktop computers, laptop computers, tablet computers, and/or smartphones), and a custom email handler 116 (e.g., one or more servers).

Each of the devices $102_x$ (x between 1 and 3 in the example shown, where 3 was chosen arbitrarily for illustration) (e.g., servers residing in a data center) comprises processing circuitry 104 (e.g., a chipset or system on chip comprising a CPU, memory, graphics processor, I/O controller, etc.), network interface circuitry 106 (e.g., Ethernet, Wi-Fi, and/or the like) and storage circuitry 108 (e.g., HDD, SSD, and/or the like, and associated control/drive circuitry) configured (e.g., via an application specific circuit, firmware, and/or software) to operate as a mail transfer agent (MTA) $110_x$. For purposes of illustration, three MTAs $110_1$-$110_3$ associated with three domains are shown, but in implementation any number of MTAs 110 associated with any number of domains may be handled by custom email handler 116.

Each of the devices $112_y$ (y between 1 and 4 in the example shown, where 4 was chosen arbitrarily for illustration) comprises processing circuitry 104 (e.g., a chipset or system on chip comprising a CPU, memory, graphics processor, I/O controller, etc.), network interface circuitry 106 (e.g., Ethernet, Wi-Fi, and/or the like) and storage circuitry 108 (e.g., HDD, SSD, and/or the like, and associated control/drive circuitry) configured (e.g., via an application specific circuit, software, and/or firmware) to operate as a mail user agent (MUA) 114 (also referred to as an "email client"). For example, MUAs $114_1$ and $114_2$ may each be a locally-installed MUA (e.g., Outlook, Outlook Express, or the like) and MUAs $114_3$ and $114_4$ may be "webmail" type MUAs running in a web browser (e.g., Gmail.com®, Outlook.com®, and/or the like). For clarity of description, the devices 112 will be referred to below as "MUAs 114." For purposes of illustration, four MUAs $114_1$-$114_4$ associated with three domains are shown, but in implementation any number of MUAs 114 associated with any number of domains may be handled by custom email handler 116.

The custom email handler 116 comprises processing circuitry 104 (e.g., a chipset or system on chip comprising a CPU, memory, graphics processor, I/O controller, etc.), network interface circuitry 106 (e.g., Ethernet, Wi-Fi, and/or the like) and storage circuitry 108 (e.g., HDD, SSD, and/or the like, and associated control/drive circuitry) configured (e.g., via an application specific circuit, software, and/or firmware) to operate as in-line email processing circuitry 118, background email processing circuitry 120, web server circuitry 122, database management system (DBMS) 124 (for simplicity of description, the DBMS 124 and an underlying database in storage circuitry 108 is referred to as simply database 124), notification generation circuitry 162, and third-party system interface circuitry 164. The custom email handler 116 may be part of one or more of the domains associated (e.g., in a DNS record) with the MTAs $112_1$-$112_3$ and/or may be part of a separate domain. The custom email handler 116, or components thereof, may reside on one or more of the devices $102_1$-$102_3$, on one or more of the devices $112_1$-$112_4$, and/or on devices separate from the devices $102_1$-$102_3$ and $112_1$-$112_4$.

The in-line email processing circuitry 118 is configured to receive an email message that is in route to one or more recipients (e.g., indicated by "RCPT TO:" field(s) of the email message where SMTP is used), process the email message, and then allow the email message to continue on to the intended recipients and/or return the email message to its original sender. That is, the processing by in-line email processing circuitry 118 occurs in line with the delivery of the email message, and thus aspects of this disclosure pertain to reducing duration of in-line processing so as to reduce delay in email message delivery.

The background email processing circuitry 120 is configured to process email messages (and/or data extracted from email messages and/or metadata about email messages) in parallel with the email messages being delivered to their intended recipients. That is, processing by background email processing circuitry 120 does not delay delivery of the email messages.

The notification generation circuitry 162 is operable to monitor email activity, monitor activity on the third-party system interface circuitry 164, and analyze data stored in the database 124. Based on the monitoring and analysis, the notification generation circuitry 162 is operable to generate notifications according to one or more notification-generation rules put in place by a network administrator. The rules may adapt according to machine learning algorithms.

The third-party system interface circuitry 164 is operable to exchange messages with third-party systems. The exchanges may be push based (i.e., the third-party system interface circuitry 164 initiates the exchange by sending a request to a third-party system) and/or pull based (i.e., the third-party system initiates the exchange by sending a request to the third-party system). The third-party system 160 may be any system which does not share credentials with the custom email handler. For example, the custom email handler may be owned by a first entity (e.g., a first corporation) with access to it restricted to authorized users of the first entity, and the third-party system 160 may be owned by a second entity (e.g., a second corporation) with access restricted to authorized users of the second entity. The third-party system interface 164 thus provides a way for limited/restricted communications between the custom email handler 116 and the third-party system in accordance with application programming interface(s) defined by either or both of the systems 116 and 160. Examples of the third-party system 160 include messaging platforms such as Slack® and Microsoft Teams®, customer relationship management tools such as Salesforce®, and/or any other networked system.

Figure 2:
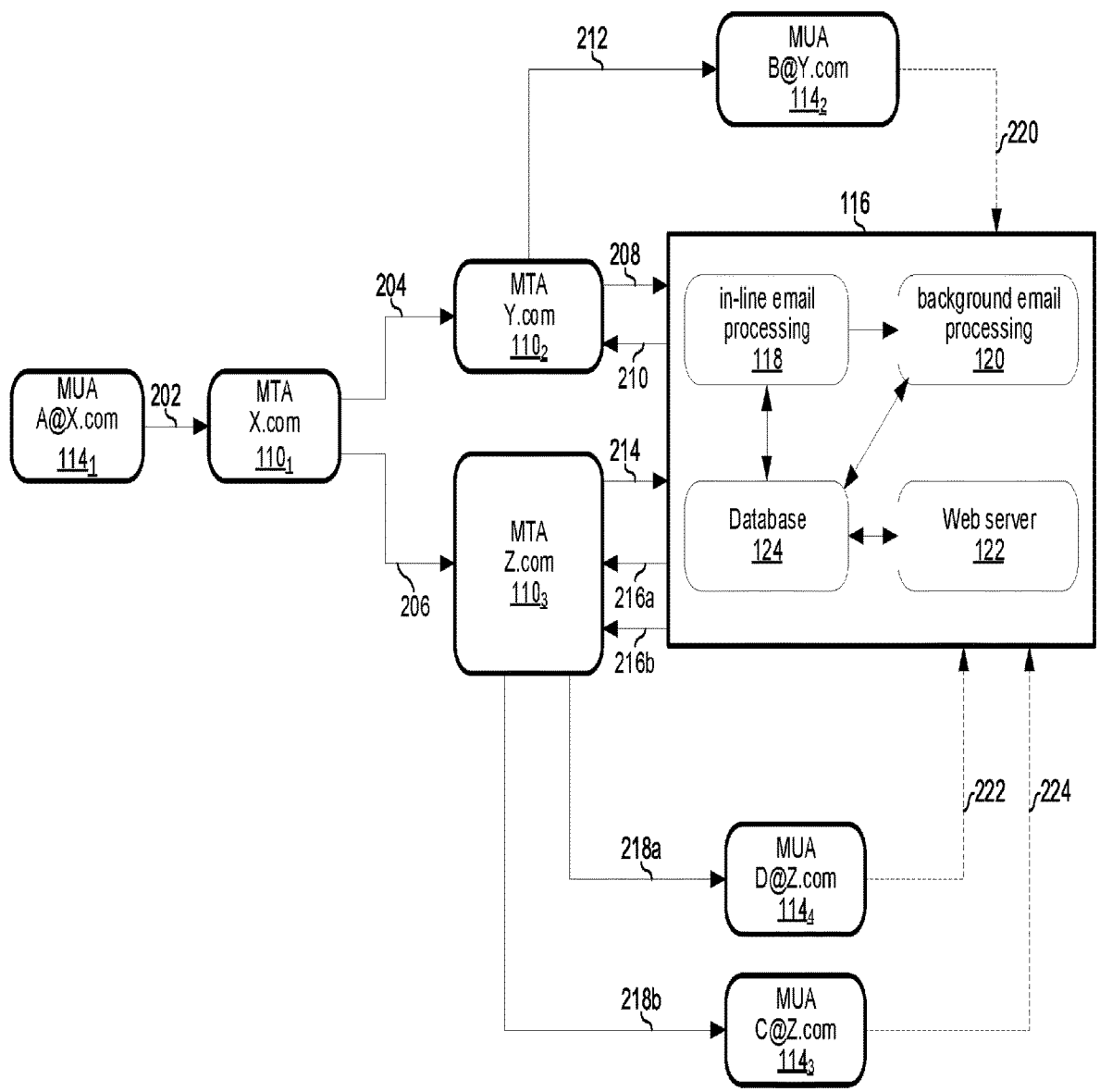
FIG. 2 illustrates a first example flow of an email message through the system of FIG. 1.

FIG. 2 illustrates a first example flow of an email message through the system of FIG. 1. In the example shown, a user A@X.com is sending an email message to three recipients: B@Y.com, C@Z.com, and D@Z.com. First, indicated by arrow 202, the message is sent from sender A's MUA $114_1$ to MTA $110_1$ (e.g., an MTA, referred to here as "sender MTA", which is configured into an "outgoing mail server" or similar setting of the MUA $114_1$). The MTA $110_1$ determines (e.g., using DNS records) that MTA $110_2$ is the MTA for B@Y.com (e.g., an MTA, referred to here as "recipient MTA", which is configured into an "incoming mail server" or similar setting of the MUA $114_2$) and the MTA $110_3$ is the recipient MTA for each of C@Z.com and D@Z.com.

Accordingly, MTA $110_1$ sends the email message to MTA $110_2$, as indicated by arrow 204, and to MTA $110_3$ as indicated by arrow 206.

After receiving the message from MTA $110_1$, the MTA $110_2$ performs the process of FIG. 3 (discussed in more detail below) for recipient B@Y.com. In the example of FIG. 2, B@Y.com is subscribed to custom incoming email message handling and thus the MTA $110_2$ determines to send the message to custom email handler 116, as indicated by arrow 208. The custom email handler 116 receives the email message, performs custom in-line processing on the email message according to rules associated with B@Y.com (which may involve interacting with database 124, queuing the message for processing by background email processing circuitry 120, and/or other operations internal to the custom email handler 116), and then returns the email message to MTA $110_2$ as indicated by arrow 210. The MUA $114_2$ then retrieves the message from MTA $110_2$ as indicated by arrow 212.

After receiving the message from MTA $110_1$, the MTA $110_3$ performs the process of FIG. 3 (discussed in more detail below) for each of recipients C@Z.com and D@Z.com. In the example of FIG. 2, each of C@Z.com and D@Z.com are subscribed to custom incoming email message handling and thus the MTA $110_3$ determines to send the email message to custom email handler 116. As shown, the MTA $110_3$ may send the email message only once as indicated by the single arrow 214 (the message having "RCPT TO:" both C@Z.com and D@Z.com). In another example implementation, the MTA $110_3$ may send the email message twice, which could be indicated by arrows 214a and 214b (the first of the two messages having "RCPT TO:" only C@Z.com and the second of the two messages having "RCPT TO:" only D@Z.com). In the example where the custom handler 116 receives the message once, it may determine whether the message is to be processed differently for C@Z.com and D@Z.com (this determination may be based on the email message's headers and/or its body and custom processing rules associated with C@Z.com and D@Z.com). If so, the custom email handler 116 may repackage the email message into multiple email messages, as, for example, described below with reference to FIGS. 4A and 4B. The custom email handler 116 them performs custom in-line processing on the email message(s) according to rules associated with C@Z.com and D@Z.com (which may involve interacting with database 124, queuing the message for processing by background email processing circuitry 120, and/or other operations internal to the custom email handler 116). The custom email handler 116 then returns two email messages to MTA $110_3$ as indicated by arrows 216a and 216b (the first of the two messages having "RCPT TO:" only C@Z.com and the second of the two messages having "RCPT TO:" D@Z.com). The MUAs $114_3$ and $114_4$ then retrieve their respective messages from MTA $110_3$ as indicated by arrows 218a and 218b.

If the email message received by B@Y.com contains remotely-hosted content (e.g., images, videos, etc.) and/or hyperlinks, the MUA $114_2$ may interact with the web server circuitry 122 as indicated by arrow 220. If the email message received by C@Z.com contains remotely hosted content (e.g., images, videos, etc.) and/or hyperlinks, the MUA $114_3$ may interact with the web server circuitry 122 as indicated by arrow 224. If the email message received by D@Z.com contains remotely hosted content (e.g., images, videos, etc.) and/or hyperlinks, the MUA $114_4$ may interact with the web server circuitry 122 as indicated by arrow 222. In response to requests for such remotely-hosted content, the custom email handler 116 may, for example, perform the process described below with reference to FIG. 11.

It is noted that the same MTA $110_X$ may be both the sender MTA and the recipient MTA (e.g., for a message from C@Z.com to D@Z.com the MTA $110_3$ may be both the sender MTA and the recipient MTA). In such a situation, as used herein, when the email message initially arrives at the MTA $110_X$ it is considered to have visited the sender MTA and not the recipient MTA. Internal processing within the MTA may then occur (e.g., storing to a different location in memory, changing a status indicator and/or the like, which may occur after receiving the email message back from custom email handler 116) so as to handoff the email message from the sender MTA to the recipient MTA such that the message is then considered to have visited the recipient MTA.

In an example implementation, communications between the MTAs 110 and the custom email handler 116 use the simple mail transfer protocol (SMTP), communications between the MUAs and the MTAs use the post office protocol 3 (POP3), internet message access protocol (IMAP), and/or messaging application programming interface, and communications between the MUAs 114 and the web server circuitry 122 use hypertext transfer protocol (HTTP). Aspects of this disclosure, however, are not dependent on the use of these protocols and any suitable protocols may be used.

In another example implementation, in some instances a recipient's MTA may not be configured to send the recipient's email messages to custom email handler 116. In such a scenario, the recipient may configure his/her MUA to forward received messages ("original message" in the remainder of this paragraph) to the custom email handler 116 which may then perform custom email processing according to rules associated with that recipient and then send the processed email message to the recipient. The custom email handler 116 may set header fields the same as the original email message such that the recipient sees all the same information (from, to, subject, etc.) that s/he would see when viewing the original message (which was forwarded to the custom email handler 116). In this manner, "forward," "reply," and "reply all" controls will work as expected as if performing those actions on the original message. Where such manipulation of email message headers are unsupported or undesired (e.g., because of spam filters in the recipient's MTA), an email generated with the MUAs "reply" button may be "RCPT TO:" the custom email handler 116 instead of the sender of the original message. Accordingly, the recipient may configure a custom processing rule in custom email handler 116 to, for example, put the sender of the original message in the subject line of the processed message so that it is easily visible from the "inbox" view on the recipient's MUA. Similarly, where "reply" and "reply all" buttons of the MUA would result in an email message "RCPT TO:" the custom email handler 116 instead of the sender of the original message, the custom email handler 116 may include "reply" and "reply all" hyperlinks in the message body that, when followed: create an email message in the MUA which will be "RCPT TO" the sender of the unprocessed message; or opens up a browser window to a web-based MUA provided by custom email handler 116, which will be "RCPT TO:" the sender of the unprocessed email.

Figure 3:
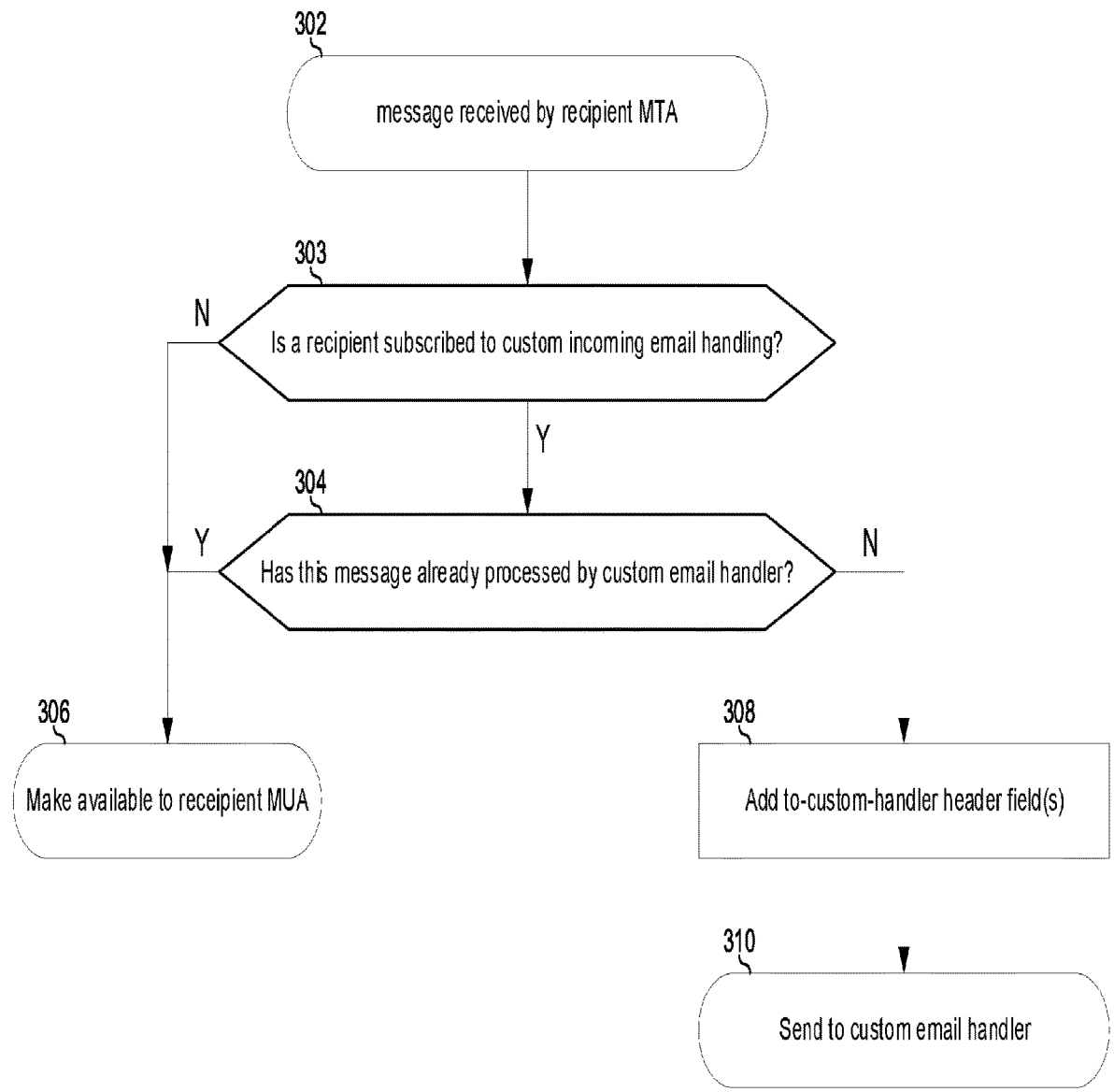
FIG. 3 is a flowchart illustrating an example process performed by a recipient mail transfer agent (MTA) of FIG. 1.

FIG. 3 is a flowchart illustrating an example process performed by a recipient mail transfer agent (MTA) of FIG. 1. In block 302, the recipient MTA receives the email message. In block 303, the recipient MTA determines whether one or more recipients of the email message is/are subscribed to custom email handling services provided by custom email handler 116. If no recipients are subscribed to services of the custom email handler 116, then the process advances to block 306. In block 306, the recipient MTA makes the email message available for retrieval by the recipient MUA(s).

Returning to block 303, if one or more recipients of the email message are subscribed to services provided by the custom email handler 116, then the process advances to block 304. In block 304, the recipient MTA determines whether the email message has already been processed by the custom email handler 116. The determination may, for example, be based on one or more fields of the email message's envelope, one or more of the message's header fields, and/or the message body of the email message. In an example implementation, this may comprise looking for one or more header fields added by the custom email handler 116, which are referred to herein as "from-custom-handler" header fields. If the message has not already been processed for this recipient by custom email handler 116, then the process advances to block 308. In block 308, the recipient MTA adds one or more header fields (referred to here as "to-custom-handler" header fields) that may be used by the custom email handler 116. In an example implementation, the to-custom-handler header(s) comprise(s) an identifier associated with the recipient in the database 124 of the custom email handler 116 and a security key associated with the recipient in the database 124 of the custom email handler 116. The identifier may, for example, be a SHA-1 hash of the recipient's domain (e.g., X.com in FIG. 2) and the security key may, for example, comprise a random string uniquely associated with the recipient, the recipient's domain, and/or an authorized group to which the recipient belongs. In block 310, the message is sent to custom email handler 116. Returning to block 304, if the message has already been processed by custom email handler 116, then the process advances to block 306.

Figure 4A:
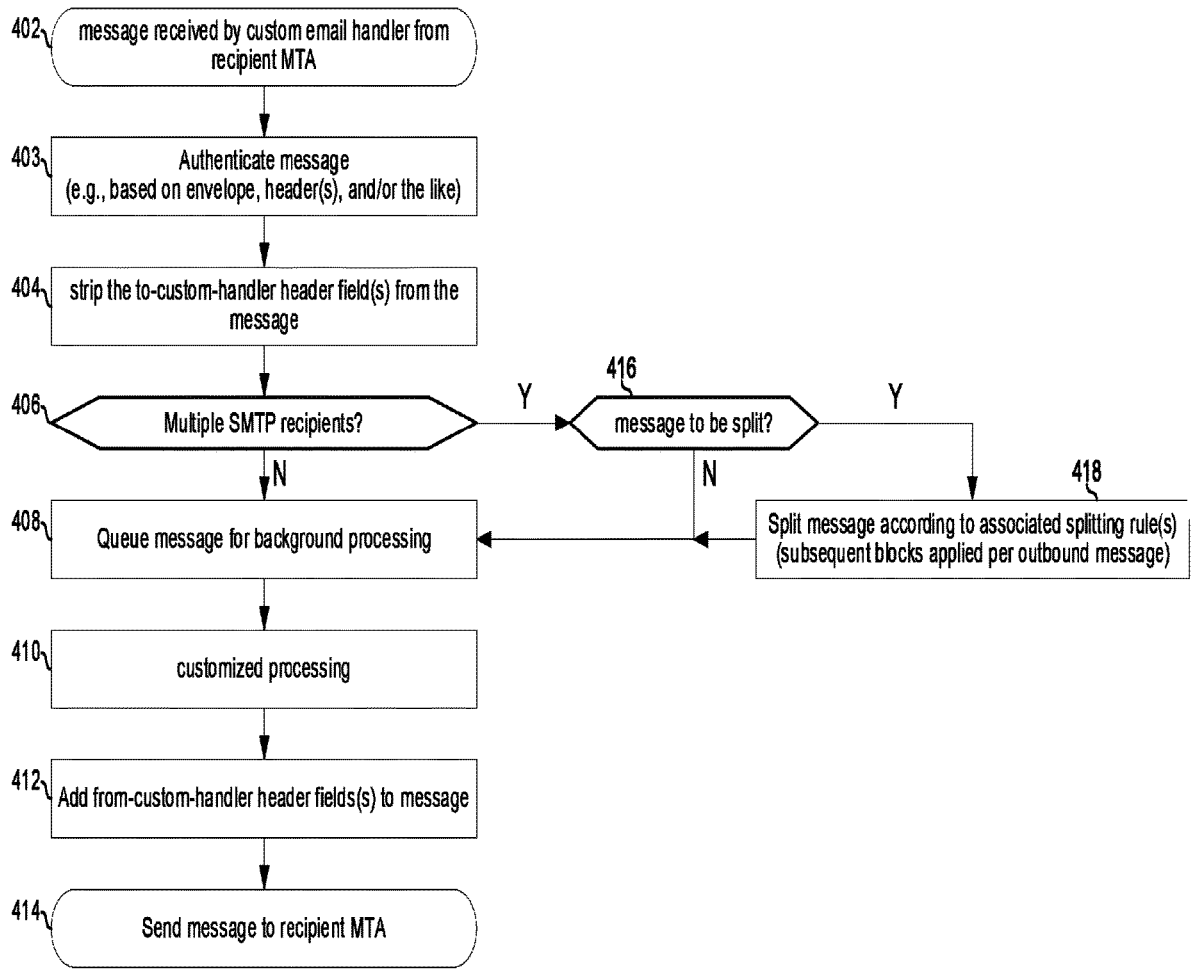
FIG. 4A is a flowchart illustrating example in-line processing performed by the customized email handler of FIG. 1.

FIG. 4A is a flowchart illustrating example in-line processing performed by the customized email handler of FIG. 1. The process begins with block 402 in which a message is received by the custom email handler 116 from a recipient MTA. Next, in block 403, the custom email handler 116 authenticates the email message. The authentication may, for example, be based on one or more fields of the email message's envelope, one or more of the email message's header fields, and/or the email message's body (which, for SMTP, begins after the first blank line in the email message). In an example implementation, this may comprise checking and/or validating the content of one or more to-custom-handler header fields added by the recipient MTA. In block 404, to-custom-handler header field(s) added by the recipient MTA are stripped from the message (for implementations using such header field(s)). In block 406, the message is parsed to determine whether the email message is destined to multiple recipients (and, in some instances, whether those multiple recipients are on the same domain and/or same MTA). This may comprise, for example, parsing the envelope to detect whether there are multiple "RCPT TO:" fields. If there are not multiple recipients, then the process advances to block 408. In block 408, the message is added to a queue to await processing by background email processing circuitry 120. The process then proceeds to block 410 without waiting for background processing to complete (i.e., background processing is asynchronous with respect to in-line processing shown in FIG. 4A). In block 410, customized in-line processing is performed on the message by in-line email processing circuitry 118. Example details of block 410 are described below with reference to FIG. 5. Next, in block 412, the in-line email processing circuitry 118 adds one or more from-custom-handler header field(s) to the message. Next, in block 414, the message is sent to the recipient MTA.

Returning to block 406, if the message is destined for multiple recipients, the process advances to block 416. In block 416, the in-line email processing circuitry 118 determines whether the inbound message is to be repackaged into multiple outbound messages, with each of the outbound messages having a different envelope (e.g., each destined for only a single SMTP recipient). It is noted that, for clarity of description, the message before repackaging is referred to herein as the "inbound message" and the messages after splitting are referred to as "outbound messages," but the inbound and outbound messages may have the same message-id and possibly other commonalities (in some instances an inbound message and its outbound messages may identical other than their envelopes). The determination performed in block 416 may be based on custom processing rules associated with the inbound message in the database 124 of the custom email handler 116. The association with the message may, for example, be based on one or more fields of the inbound message's envelope, one or more of the inbound message's header fields, and/or the inbound message's body. For example, rules may be associated per sender, per group-of-senders, per recipient, per group-of-recipients, per domain, per group-of-domains, per IP address, per group of IP addresses, per geographical location, per time of email message transmission or receipt, and/or the like. Any particular rule may determine whether to repackage an inbound message based on one or more fields of the inbound message's envelope, one or more of the inbound message's header fields, and/or the inbound message's body. As just a few non-limiting examples of possible rules for deciding whether to repackage an inbound message: decide whether to repackage the inbound message based on its content type header field (e.g., do not repackage messages with content type multipart); decide whether to repackage the inbound message based on whether it has one or more attachments (e.g., do not repackage messages with attachments); decide whether to repackage the inbound message based on its size (e.g., do not repackage email messages over a certain size); decide whether to repackage the inbound message based on its "to:", "cc:", and "bcc" header fields (e.g., do not repackage messages with more than N (an integer) recipients); decide whether to repackage the inbound message based on number of recipients and email message size (e.g., do not repackage message if number of recipients multiplied by size of message is above a determined threshold); and decide whether to repackage the inbound message based on whether one or more recipients of the message have set a preference that s/he desires to track his/her email usage (e.g., whether s/he has opened the message, how many times s/he has opened the message, time at which s/he opened the message, how long s/he read the message, and/or the like). If the inbound message is not to be repackaged, the process advances to block 408 (described above). If the inbound message is to be repackages, the process advances to block 418.

In block 418, the message is repackaged according to repackaging rules associated with the inbound message and/or repackaging rules associated with the outbound messages. As in block 416, the association of a repackaging rule with the inbound message may, for example, be based on one or more fields of the inbound message's envelope, one or more of the inbound message's header fields, and/or the inbound message's body. Similarly, the association of a repackaging rule with an outbound message may, for example, be based on one or more fields of the outbound message's envelope, one or more of the outbound message's header fields, and/or the outbound message's body. As just a few non-limiting examples of possible rules for deciding how to repackage an inbound message: decide how to repackage the inbound message based on whether it has one or more attachments (e.g., do not copy the attachments to the outbound messages but instead store the attachment and insert a hyperlink); decide how to repackage the inbound message based on its "to:", "cc:", and "bcc" header fields (e.g., copy attachments to outbound messages unless there are more than N recipients, in which case store attachments and send link); and decide how to repackage if more than one recipient of the message is subscribed to services provided by the custom email handler and has set his/her profile preferences to track his/her email usage. After repackaging in block 418, the process advances to block 408 and the remaining blocks 408, 410, 412, and 414, described above, are performed per outbound message. In this manner, repackaging enables the custom email handler 116 to process the inbound message differently for different recipients.

Figure 4B:
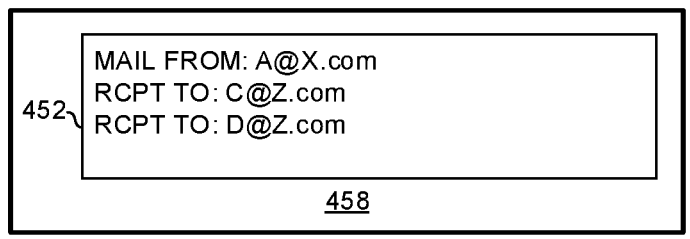
FIG. 4B illustrates example details of repackaging an email message into multiple envelopes.
Figure 4B:
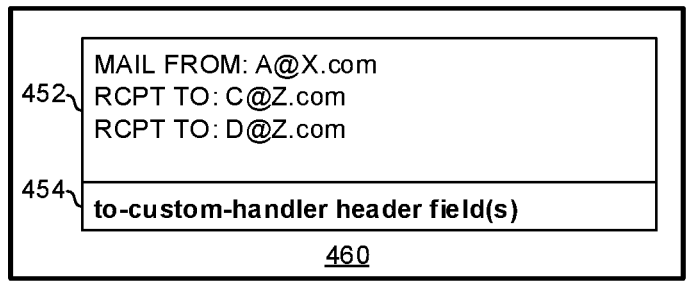
Figure 4B:
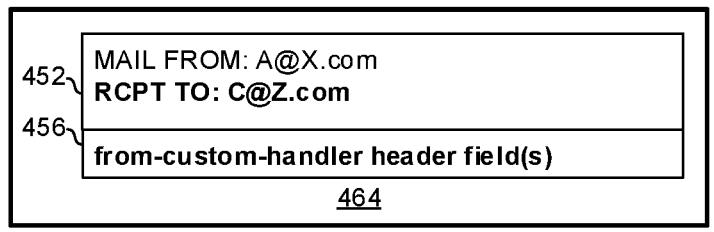
Figure 4B:

FIG. 4B illustrates example details of repackaging an inbound message into multiple outbound messages. Called out as 458 is the inbound message as it arrives at the recipient MTA (e.g., along the arrow 206 in FIG. 2). The envelope 452 (other components of the message 458 are omitted for clarity of illustration) comprises two recipients: C@Z.com and D@Z.com. Called out as 460 is the inbound message as it leaves the recipient MTA destined for the custom email handler (e.g., along the arrow 214 in FIG. 2A). The recipient MTA has added the to-custom-handler header field(s) 454. Called out as 464 is a first outbound message (e.g., along the arrow 216a in FIG. 2) resulting from repackaging of the inbound message 460 by the custom email handler 116. The outbound email message 464 has only a first of the two recipients in its envelope 452, and has one or more from-custom-handler header fields 456. Called out as 466 is a second outbound message (e.g., along the arrow 216b in FIG. 2) resulting from repackaging of the inbound message 460 by the custom email handler 116. The outbound email message 466 has only a second of the two recipients in its envelope 452, and has one or more from-custom-handler header fields 456. In this manner, each of the outbound email messages 464 and 466 can be processed differently by the custom email handler 116 (i.e., custom email processing rules associated with C@Z.com can be applied to email message 464 and custom email processing rules associated with D@Z.com can be applied to email message 466).

Figure 5A:
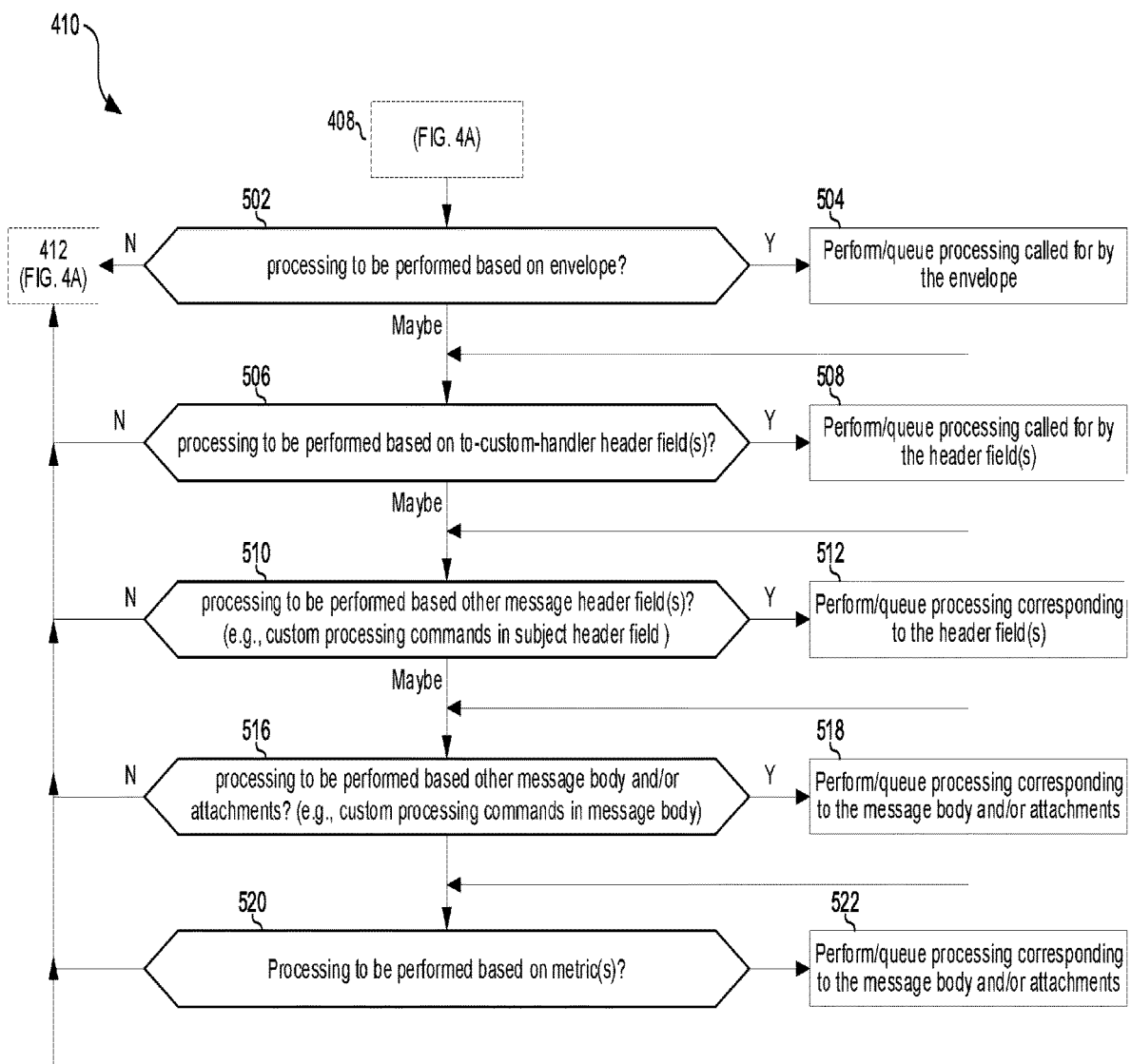
FIG. 5A is a flowchart illustrating an example implementation of the customized email processing block of FIG. 4A.

FIG. 5A is a flowchart illustrating an example implementation of the customized in-line processing block 410 of FIG. 4A. In block 502, the custom email handler 116 processes the envelope of the email message. If the envelope of the email message dictates that no custom processing of the email message is to be performed, then the process advances to block 412 of FIG. 4A. If the envelope of the message dictates some particular custom processing to be performed on the message, then the process advances to block 504 and the custom processing is performed (and/or queued to be performed later by background processing circuitry). If the envelope of the message indicates that custom processing of the message is possibly called for, then the process advances to block 506.

In block 506, the custom email handler 116 parses the to-custom-handler header field(s) of the email message (which may have been automatically inserted by the recipient MTA). If the to-custom-handler header field(s) of the message dictate(s) that no custom processing of the message is to be performed, then the process advances to block 412 of FIG. 4A. If the to-custom-handler header field(s) of the message dictate(s) some particular custom processing to be performed on the message, then the process advances to block 508 and the custom processing is performed (and/or queued to be performed later by background processing circuitry). If the to-custom-handler header field(s) of the message indicates that custom processing of the message is possibly be called for, then the process advances to block 510.

In block 510, the custom email handler 116 parses one or more other header field(s) of the email message. One or more of the other header field(s) (such as "message-id") may comprise text automatically generated by the sender MUA, the sender MTA, and/or the recipient MTA. One or more of the other message header fields, such as the "to:," "Cc:," "Bcc:" and "subject:" header fields, may comprise text entered by a sender of the email message via a compose interface provided by the sender MUA. For example, referring briefly to FIG. 5B, there is shown a compose interface 552 of a webmail MUA running in a browser window 550. The MUA puts one or more email addresses entered by the sender (e.g., typed, copy-pasted, selected from a dropdown list, etc.) into interface element 554 into one or more "to:" message header fields of a resulting email message, the MUA puts one or more email addresses entered by the sender into interface element 556 into one or more "Cc:" message header fields of the resulting email message, the MUA puts one or more email addresses entered by the sender into interface element 558 into one or more "Bcc:" message header fields of the resulting email message, the MUA puts text entered by the sender into the interface element 560 into a "subject" message header field of the resulting email message, the MUA puts text entered by the sender into the interface element 562 into the message body of the resulting email message.

Returning to block 510 of FIG. 5A, if the other message header field(s) of the message dictate(s) that no custom processing of the message is to be performed, then the process advances to block 412 of FIG. 4A. If the other message header field(s) of the message dictate(s) some particular custom processing to be performed on the message, then the process advances to block 512 and the custom processing is performed (and/or queued to be performed later by background processing circuitry). If the other message header field(s) of the message indicate(s) that custom processing of the message is possibly called for, then the process advances to block 516.

In block 516, the custom email handler 116 parses the message body and/or attachments. If the message body and/or attachment(s) dictate(s) that no custom processing of the message is to be performed, then the process advances to block 412 of FIG. 4A. If the message body and/or attachments dictate(s) some particular custom processing to be performed on the message, then the process advances to block 518 and the custom processing is performed (and/or queued to be performed later by background processing circuitry). If the message body and/or attachments indicate(s) that custom processing of the message is possibly called for, then the process advances to block 520.

In block 520, the email message is processed to calculate one or more metrics (e.g., a spam metric and/or a "connectedness metric," each of which is described below with reference to FIG. 10A). If the metric(s) dictate(s) some particular custom processing to be performed on the message, then the process advances to block 522 and the custom processing is performed (and/or queued to be performed later by background processing circuitry).

Figure 5B:
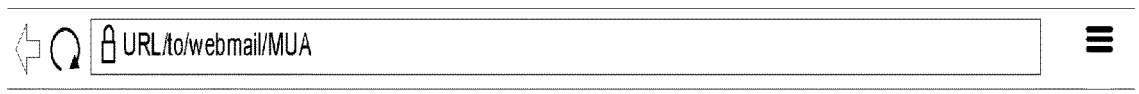
FIG. 5B illustrates an example email message composing interface of a maul user agent (MUA).

In block 510 and/or block 516, parsing may comprise searching for custom email processing commands entered by the sender of the email message (e.g., via the "compose message" interface of FIG. 5B). In another example implementation, the sender MUA, the sender MTA, and/or the recipient MTA may insert custom processing commands, and may do so in header field(s) which are not typically available for the sender to manually edit. In such an implementation, the custom email handler 116 may also parse such header field(s) in search of custom processing commands.

Custom processing commands may have a predefined format defined in the database 124 of the custom email handler 116 such that the custom email handler 116 can reliably distinguish them from other text using, for example, regular expression matching. One example format of custom email processing commands is the hashtag format (i.e., #command). Since MUAs universally (or nearly so) enable a sender to input text in the field body of the subject field, and in the message body of the email message, these two portions of email messages may be where the custom email handler 116 searches for custom processing commands. In an example implementation, the custom processing commands are plain text (e.g., with any desired encoding such as ASCII, UTF-8, UTF-16, etc.) and a subject header field or message body comprising a custom processing command is fully compliant with applicable standards (e.g., RFC 5322)). In this manner, regardless of the MUA that a sender is using at any given time, s/he can easily provide custom processing commands to the custom email handler 116 without having to install a specific MUA, and without having to install any add-ons or plugins for his/her existing MUA. This enables providing custom email processing commands from, for example, any web browser in which a webmail MUA is running, and from any native MUA on a PC/tablet/smartphone/etc. (e.g., the "stock" mail client on Android®, iOS®, etc.). In an example implementation, custom processing commands are stripped from messages by the custom email handler 116 before the messages are sent to the recipient MTA(s) (such that the recipients may be unaware the custom processing commands were ever present).

To illustrate an example use of a custom processing command, A@X.com (or sender MUA $114_1$ or sender MTA $110_1$) may insert a custom processing command into an email message destined to B@Y.com when it is known (e.g., as a result of a previously bounced message or a notice from custom email handler 116) that B@Y.com is subscribed to custom email handling services provided by the custom email handler. The processing command inserted into the email message from A@X.com to B@Y.com may, for example, comprise an identifier of A@X.com via which custom email handler 116 can authenticate that the email message came from A@X.com (e.g., the custom processing code may comprise an encrypted password where A@X.com has previously been authenticated with custom email handler 116 and exchanged security keys with custom email handler 116). Successful authentication of the identifier in the custom processing command may then trigger the custom email handler 116 to perform certain sender-requested processing (in some instances such processing will only be performed if such processing is approved by, or at least not inconsistent with, custom processing rules associated with B@Y.com).

As an example, successful authentication via a custom processing command may trigger the custom email handler 116 to allow the message through to B@Y.com despite having a SPAM metric that would otherwise have resulted in the email message getting dropped. As another example, even though the email message may still be dropped as a result of custom processing rules associated with B@Y.com, successful authentication of A@X.com via the custom processing code may trigger custom email handler 116 to highlight the message on a "spam report" email message provided to B@Y.com (e.g., provided weekly to B@Y.com to enable B@Y.com to manage his/her custom email processing rules). For example, authentication may trigger the custom email handler 116 to include the message on the spam report in the first place, to move the message to the top of the spam report, and/or provide a blurb about why B@Y.com may (or may not) want to whitelist A@X.com. The text of this blurb may be provided by A@X.com as part of the custom processing command. Alternatively, the text of this blurb may be auto generated by custom email handler 116 (e.g., according to custom processing rules associated with B@Y.com and/or based on data and metadata in the database 124 of the custom email hander 116). For example, the custom email handler 116 may generate a "connectedness metric" (discussed in further detail below) for A@X.com and B@Y.com and provide the metric on the spam report. Upon seeing the spam report, B@Y.com may then decide to whitelist A@X.com because, for example, a high connectedness metric indicates that A@X.com frequently corresponds with a third-party (e.g., as indicated by B@Y.com often sending email messages to and/or opening email messages from such third party) whom also frequency corresponds with B@Y.com (e.g., the third party often sends email messages to and/or opens email messages from B@Y.com).

Figure 6A:
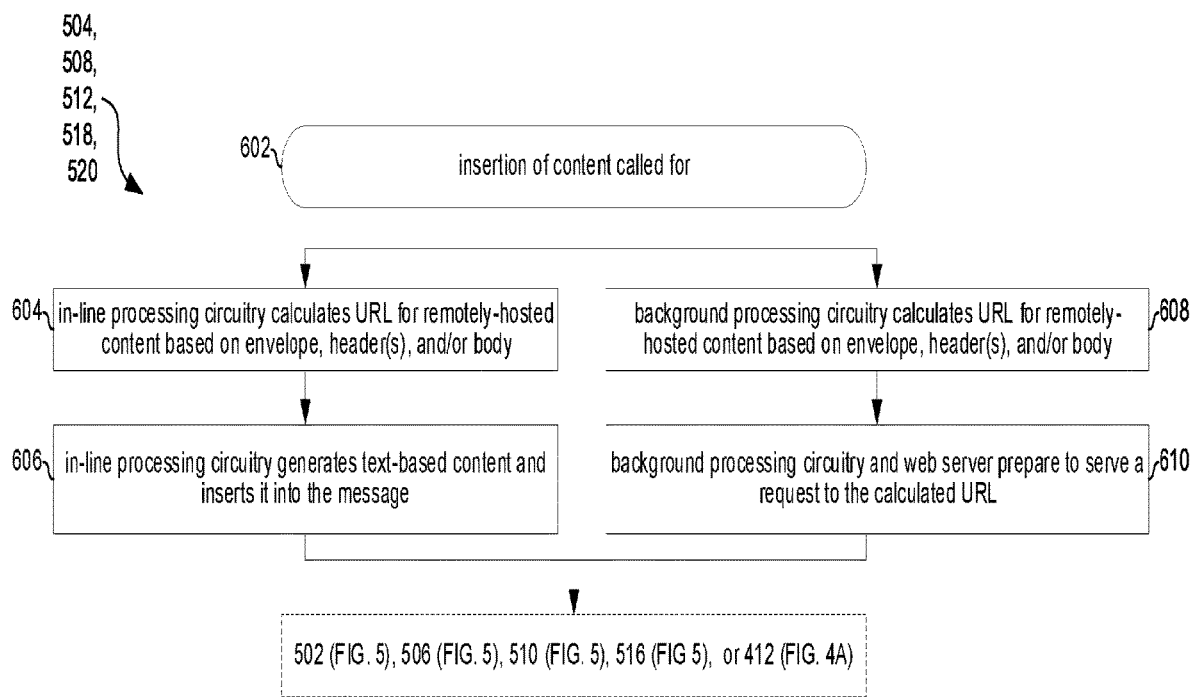
FIG. 6A is a flowchart illustrating an example implementation in which one of the blocks of FIG. 5A calls for the custom email handler to add content to an email message during in-line processing of the email message.

FIG. 6A is a flowchart illustrating an example implementation in which one of the blocks of FIG. 5A calls for the custom email handler to insert content to an email message during in-line processing of the email message. In block 602, one of blocks 502, 506, 510, 516, and 520 of FIG. 5A has called for the custom email handler to insert content into the message. From block 602, the process proceeds in parallel to blocks 604 and 608.

In block 604, if the content to be inserted comprises linked/remotely-hosted content, the in-line email processing circuitry 118 calculates a uniform resource locator (URL) for such content. The URL may, for example, be based on the envelope, header field(s), message body, spam metric, and/or connectedness metric of, or associated with, the message. The URL may comprise, for example, one or more of: a hash of the recipient's domain, a hash of the recipient's email address; a hash of the body of the message-id header field; a random generator number that is unique (to a desired likelihood) to this particular URL, a value corresponding to the body of the message-id header filed encrypted with a security key that is associated with the recipient and/or recipient's domain in the database 124 of the custom email handler 116. If there is no linked/remotely-hosted content to be included, then block 604 may be bypassed.

In block 606, the in-line email processing circuitry 118 generates text-based content to be included in the message body of the email message. This text-based content may be plain text and/or may be HTML (or other suitable markup language) formatted text. Where the content to be inserted includes linked/remotely-hosted content, the text-based content generated in block 606 comprises HTML element(s) including the URL calculated in block 604. After block 606, the process advances to one of blocks 506, 510, 516, 520, or 412 (depending on whether FIG. 6A corresponds to block 504, 508, 512, 518, or 520).

The inserted content may be any content desired by the recipient as set forth in custom email processing rules associated with the recipient. Any particular rule which results in the insertion of such content may be triggered by, for example, the message being from a particular sender, the message arriving at particular times, the message containing particular words or phrases in its subject header field and/or message body, and/or any other suitable triggers. Just a few examples of such rules will now be described. Other examples will be obvious to one of ordinary skill in the art in view of the presented examples.

A custom processing rule for a particular recipient may trigger the custom email handler 116 to insert a hyperlink that, when followed (e.g., clicked, touched, or whatever the method of user interaction), triggers the custom email handler 116 to automatically generate and send a reply message using a predefined template. The template may, for example, be automatically selected or suggested by the custom email handler 116 based on the email message, data in the database 124, and/or metadata in the database 124. Multiple autoreply links each associated with a different template may be included in a particular email message such that the recipient can choose which is most appropriate.

A custom processing rule for a particular recipient may trigger the custom email handler 116 to insert a hyperlink that, when followed (e.g., clicked, touched, or whatever the method of user interaction), triggers the custom email handler 116 to automatically resend the email message to the recipient at a later time (e.g., at some predefined time or after some predefined interval set in the recipient's custom email handling profile/settings). Multiple links each associated with a different time at which to resend the email message may be inserted so that the recipient is presented with options.

A custom processing rule for a particular recipient may trigger the custom email handler 116 to insert a hyperlink that, when followed (e.g., clicked, touched, or whatever the method of user interaction), triggers the custom email handler 116 to generate and send a report email message to the recipient. The report email message may provide additional info about the email message in which the hyperlink was inserted, and/or about the processing of the email message that took place in the custom email handler 116 (e.g., which rules were triggered by it, the resulting actions taken, which recipients have opened the email message, which recipients have replied and/or forwarded the message, and/or the like).

A custom processing rule for a particular recipient may trigger the custom email handler 116 to insert data extracted from the email message back into the email message in a predetermined format and/or location. For example, a recipient that deals in real estate may setup a rule that causes the custom email handler 116 to parse email messages looking for information about real estate listings (e.g., parsing the message body in search of multiple listing service (MLS) numbers, street addresses, neighborhoods, number of bedrooms, number of bathrooms, square footage, school district, and/or any other information which may be present in a real estate listing or discussion about a real estate listing), and, upon finding such information in the message body, insert it in a predefined location and/or format within the subject header field and/or message body of the email message (e.g., upon detecting a MLS number in a message body, inserting that MLS number in the subject header field). The custom email handler 116 may additionally insert the extracted data into the database 124 (e.g., upon detecting a MLS number, number of bedrooms, number of bathrooms and address in an email message, inserting this data into corresponding fields of the database 124 record for the listing). As another example, a recipient that works in the legal industry may setup a rule that causes the custom email handler 116 to parse email messages looking for docket/matter numbers and, upon finding a docket/matter number in the message body, insert it in a predefined location and/or format within the subject header field and/or message body of the email message. The extracted data may additionally be inserted into the database 124 of the custom email handler (e.g., upon detecting a matter number in a message body, the email message may be stored in a record of the database 124 associated with the matter number). As another example, a recipient may setup a rule that causes the custom email handler 116 to search for sender signatures within the message body and, if a signature is found, extract the content of the signature (e.g., name, phone number, address, etc.) into the database 124 (e.g., an address book table).

A custom processing rule for a particular recipient may trigger the custom email handler 116 to insert metadata generated about the email message. For example, a recipient may setup a rule such that the custom email handler may search the database 124 to identify previous email messages related to this email message (e.g., based on header field(s), words present in the subject and/or body, and/or any other suitable characteristic), generate a summary of previously sent and/or received related email messages, and insert the summary into the message body. The summary may indicate, for example, whether a previous email message from this sender was never opened by the recipient, how many email messages from this sender the recipient has opened in the past, how many email messages the recipient has sent to this sender, and/or the like. The summary may additionally, or alternatively, be stored in the custom email handler 116 and made accessible via a link inserted into the email message. The summary may, for example, be a graphical and/or text based representation of the email thread and/or related email threads (e.g., in a "family tree" type diagram") with each email message represented by a hyperlink that, when followed, bring up the email message and/or metadata about the message. In an example implementation, any forward and/or reply history in the message body of the email message may be replaced by the such a summary.

A custom processing rule for a particular recipient may trigger the custom email handler 116 to insert data from third-party sources (or links thereto) into the message body and/or subject header field of the email message. For example, a recipient that deals in real estate may setup a rule that causes the custom email handler 116 to parse email messages looking for information about real estate listings and, upon finding such information in the message body, retrieve a URL to the real estate listing on a real estate listing website, and insert a hyperlink to the URL into the message body of the email message. As another example, a recipient that works in the legal industry may setup a rule that causes the custom email handler 116 to parse email messages looking for legal citations and, upon finding a legal citation in the message body, retrieve a URL to a copy of the reference (court opinion, treatise, article, etc.) and insert a hyperlink to the URL into the message body of the email message. Additionally, or alternatively, the custom email handler 116 may download a copy of the reference and attach it to the email message.

In parallel with blocks 604 and 606 are blocks 608 and 610 (which may take place any time during or after performance of blocks 604 and 606 by the in-line email processing circuitry 118).

In block 608, background email processing circuitry 120 independently calculates the same URL as calculated in block 604, described above. If there is no linked/remotely-hosted content to be included, then block 608 may be bypassed.

In block 610, the background email processing circuitry 120 prepares to receive a request at the calculated URL. This may comprise associating, in the database 124, the calculated URL with content (e.g., an image file, a screenshot of a web page, as discussed below, and/or the like) to be served in a response to a received request for the calculated URL. This may also comprise, for example, parsing the email message to extract data from, and/or generate metadata about, the email message, and store such data and/or metadata to the database 124.

Figure 6B:
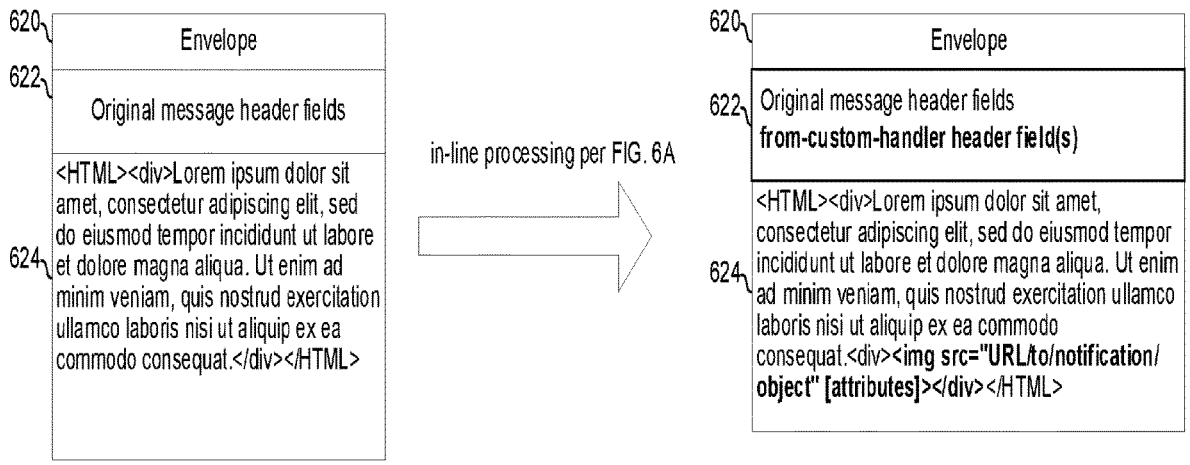
FIG. 6B illustrates an example implementation of the process of FIG. 6A in which an HTML element is inserted into HTML-formatted email message body during in-line processing.

FIG. 6B illustrates an example implementations of the process of FIG. 6A in which an HTML element is inserted into HTML-formatted email message body during in-line processing. As shown, after in-line processing per the process of FIG. 6A, one or more from-custom-handler header fields 622 has been added to the message, and an HTML element containing a calculated URL has been inserted into the message body 624.

Figure 6C:
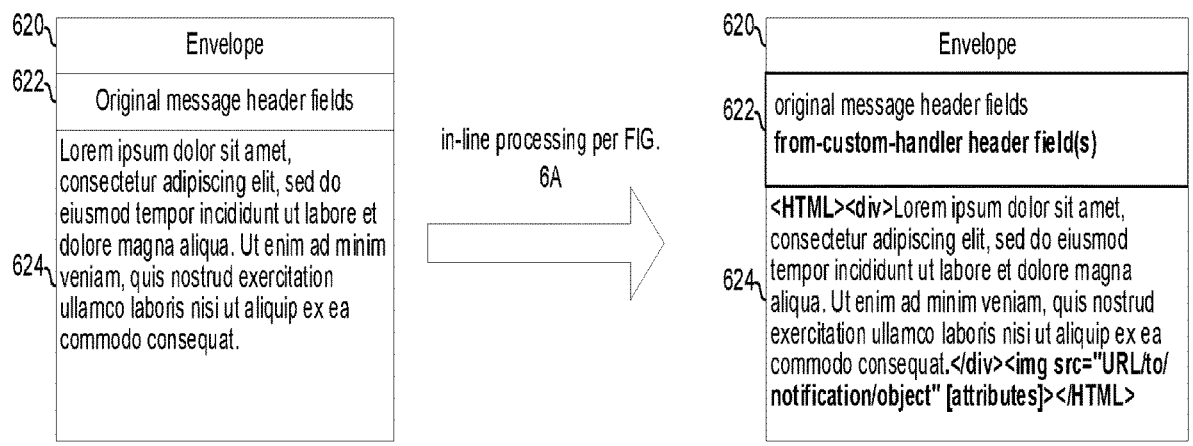
FIG. 6C illustrates an example implementation of the process of FIG. 6A in which plain text formatted email message content is converted to HTML-formatted email message with content added by the custom email handler.

FIG. 6C is similar to FIG. 6B, but since the message body of the email message was plain text, it has been converted to HTML to support the insertion of the HTML element with the calculated URL.

Figure 7A:
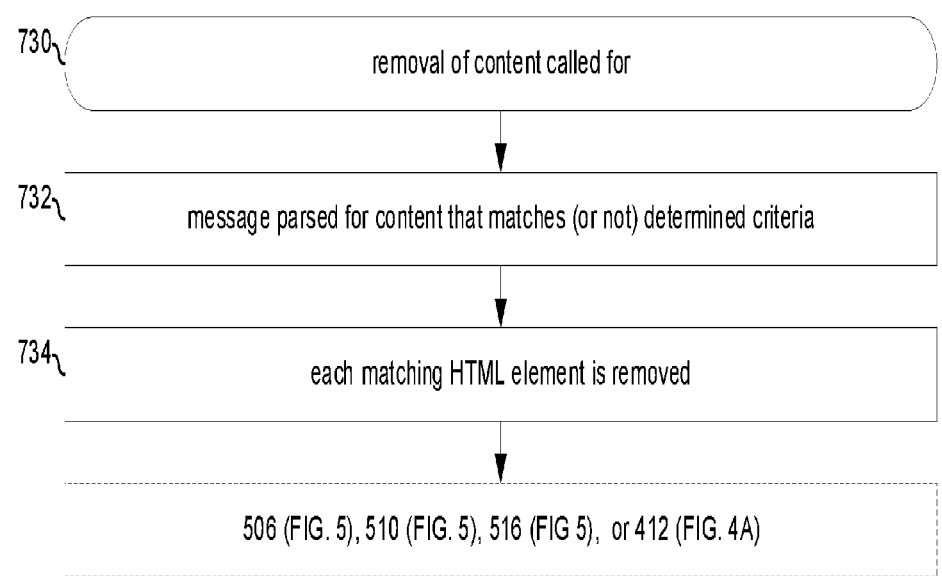
FIG. 7A is a flowchart illustrating an example implementation in which one of the blocks of FIG. 5A calls for the custom email handler to remove content from an email message during in-line processing of the email message.

FIG. 7A is a flowchart illustrating an example implementation in which one of the blocks of FIG. 5A calls for the custom email handler to remove content from the email message during in-line processing. In block 730, one of blocks 502, 506, 510, 516, and 520 of FIG. 5A has called for the custom email handler to remove content from the email message during in-line processing of the email message. In block 732, the in-line processing circuitry parses the message searching for content that matches (or not) criteria set forth in one or more custom processing rules which are applicable to the message. The rule may be determined to be applicable to the message based, for example, on information in the message's envelope, one or more of the message's header fields, the message's body, the message's spam metric, and/or the messages connectedness metric. The criteria may, for example, be regular expressions and/or substrings that match particular keywords, particular strings, particular HTML tags, particular domains, particular subdomains, particular protocols (e.g., http, https, ftp, etc.) particular HTTP GET parameters, and/or the like. In block 734, any matching content found in the email message (or in particular portions of the email message such its body) is removed. For example, the search criteria may be a regular expression and/or substring that matches HTML elements (e.g., <img>, <video>, <a>, and/or the like) having (or not having) particular URLs (e.g., URLs stored (or not) in a whitelist or blacklist). The search criteria may, for example, be tailored to detect URLs which marketers and other third parties are using to: detect whether the email message has been opened by the recipient; whether hyperlinks within the email message have been clicked; and/or the like. In this regard, one or more of blocks 502, 506, 510, 516, and 520 of FIG. 5 may comprise generation of a tracking metric indicating the likelihood that content of the email message is being used (by marketers, etc.) for online behavior tracking (or just "tracking" as used herein). Example tracking activities include: tracking what email messages are being opened, tracking when email messages are being opened, tracking from which devices email messages are being opened, tracking how long email messages are being read, tracking from which geographical locations email messages are being opened, tracking what hyperlinks are being followed, tracking when hyperlinks are being followed, tracking from which devices and/or browsers hyperlinks are being followed, tracking from which geographical locations hyperlinks are being followed, tracking what URLs are being visited, tracking when URLs are being visited, tracking from which devices and/or browsers URLs are being visited, tracking from which geographical locations URLs are being visited, tracking what email attachments are being downloaded and/or opened, tracking when email attachments are being downloaded and/or opened, tracking from which devices email attachments are being downloaded and/or opened, and/or tracking from which geographical locations email attachments are being downloaded and/or opened. One or more of blocks 504, 508, 512, 518, and 522 may be triggered by, for example, the tracking metric being above a determined threshold.

Figure 7B:
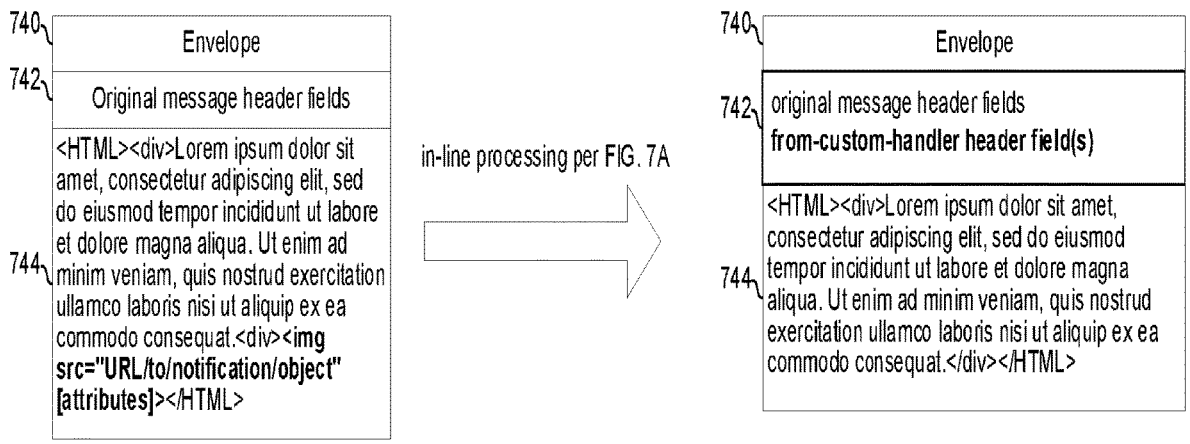
FIG. 7B illustrates an example implementations of the process of FIG. 7A in which content is removed from an email message body during in-line processing of the email message.

FIG. 7B illustrates an example implementations of the process of FIG. 7A in which content is removed from an email message body during in-line processing of the email message. As shown, after in-line processing per the process of FIG. 7A, one or more from-custom-handler header fields have been added to the header fields 742, and an HTML element containing a URL has been removed from the message body 744. The example in FIG. 7B may, for example, represent a scenario in which the custom email handler 116 determines a tracking metric for the original HTML element to be above a determined threshold. The value of the tracking metric for the HTML element may, for example, be based on the URL of the HTML element containing one or more regular expressions and/or substrings which have previously been identified as being associated with companies which perform such tracking (and are stored in the database 124). The value of the tracking metric for the HTML element may, for example, be based on attributes of the HTML element such as size (e.g., images which are below some threshold number of pixels may correspond to higher tracking metric values (i.e., higher likelihood of being used for tracking)) and/or transparency (e.g., images having a transparency attribute that is above a determined threshold may correspond to higher tracking metric values). The value of the tracking metric for the HTML element may, for example, be based on location of the image within the message body (e.g., the custom email handler 116 may be configured to detect email sender signatures within message bodies, and images which are below the signature may be correspond to higher tracking metric values).

Figure 8A:
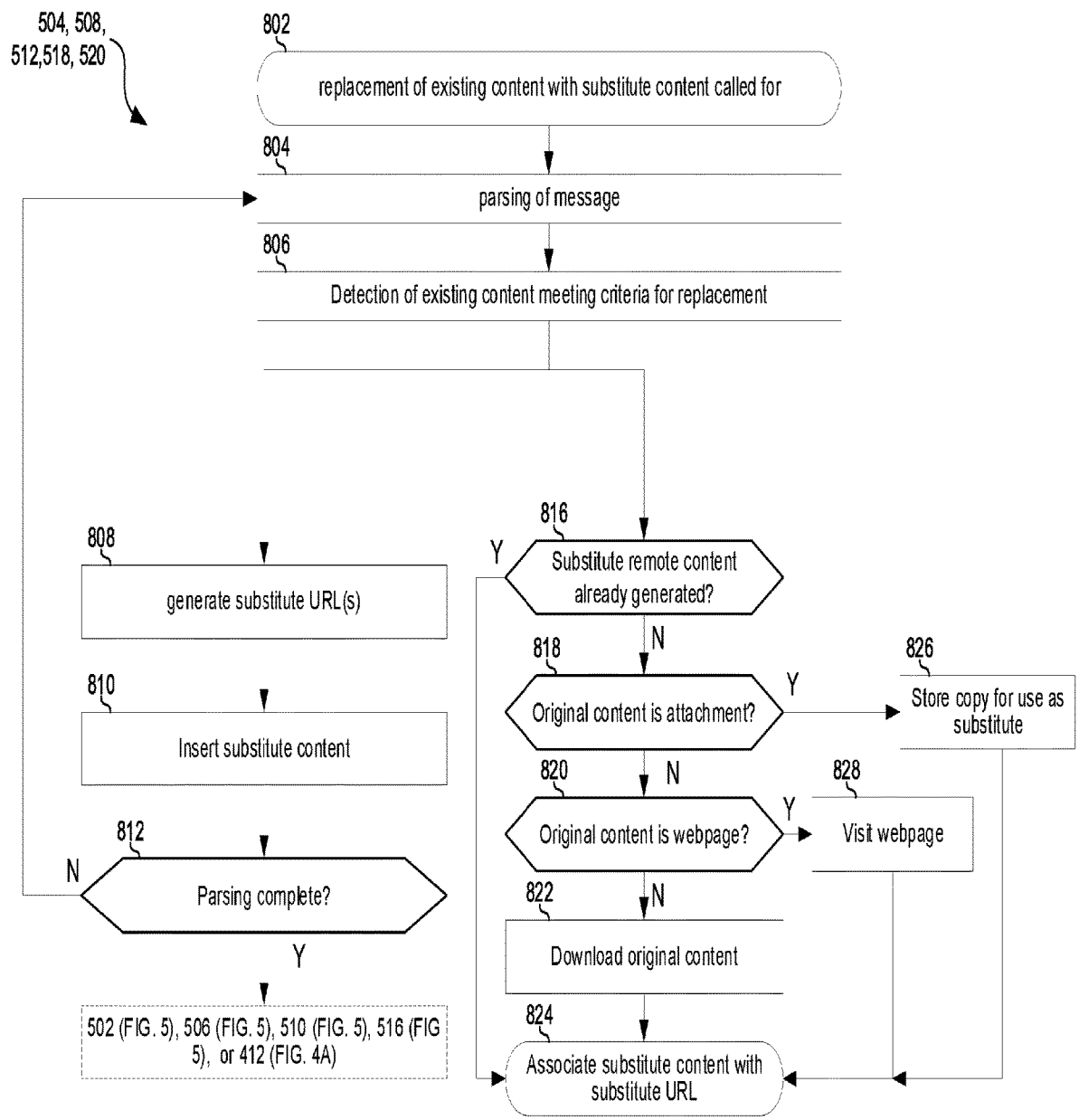
FIG. 8A is a flowchart illustrating an example implementation in which one of the blocks of FIG. 5A calls for the custom email handler to replace original email message content with substitute email message content.

FIG. 8A is a flowchart illustrating an example implementation in which one of the blocks of FIG. 5A calls for the custom email handler to replace original email message content with substitute email message content.

In block 802, one of blocks 502, 506, 510, 516, and 520 of FIG. 5A has called for the custom email handler to replace original content of an email message with substitute content. The original content may comprise text within the message body (plain and/or HTML formatted), attachments to the message, and/or remote content referenced by one or more URLs in the text and/or attachments. Similarly, the substitute content may comprise text, attachments, and/or remote content.

In block 804, the custom email handler 116 parses a next character/word/line/etc., of the email message.

In block 806, the custom email handler 116 detects original content of the email message that meets criteria triggering the custom email handler 116 to replace it with substitute content. The criteria may be applied to the text of the email message itself (e.g., the custom email handler 116 may parse the envelope, header fields, and/or message body), to attachments to the email message (e.g., the custom email handler may parse the file type, file size, and/or the contents of the attachments), and/or to the remote content of the email message (e.g., the custom email handler may visit/download/etc. the remote content and scan it). An example criterion which may be applied in block 806 is whether a tracking metric for the content is above a determined threshold, similar to as described above with reference to FIGS. 7A and 7B. As another example, criteria applied in block 806 may comprise, for example, the message body containing non-URL text which matches one or more regular expressions and/or substrings. As another example, criteria applied in block 806 may be the same as or similar to criteria discussed above with respect to FIGS. 6A-7B for insertion and removal of content from an email message. After block 806, the process proceeds in parallel to blocks 808 and 816.

In block 808, if the original content comprises remote content, then in block 808 the custom email handler generates a URL for the substitute content. After block 808, the process advances to block 810. In block 810, the custom email handler 116 inserts the substitute content in place of the original content in the email message. The text and/or attachments of the substitute content (including any URLs generated in block 808) may be retrieved from the database 124 of the custom email handler 116 and/or generated on the fly. For example, text of the original content may comprise a <div> or <span> element containing an <img> element referencing an original URL, and the substitute content inserted in its place may comprise a <div> or <span> element containing an <img> element referencing a substitute URL generated in block 808. In block 812, if further parsing of the email message is to be performed (e.g., the parser has not reached the end of the email message, has more time available for parsing, has not reached a maximum amount of content substitutions, and/or any other criteria for continuing parsing) the process returns to block 804. Otherwise the process advances to one of blocks 503, 506, 510, 516, or 412.

In 816, the custom email handler 116 determines whether it has previously generated substitute remote content corresponding to the original content detected in block 806. If so, then the process advances to block 824. In block 824, the substitute remote content is associated with the one or more substitute URLs generated in block 808. In this manner, the custom email handler 116 will be ready to serve the substitute content in response to receiving a request for the substitute URL(s).

Returning to block 816, if the custom email handler 116 has not previously generated substitute content for the original content detected in block 806, the process advances to block 818. In block 818, if the original content to be replaced is an attachment, the process advances to block 826. In block 826, the attachment is stored to the database 124. After block 826, the process advances to block 824. In block 824, the copy of the content stored in the database 124 is associated with one or more substitute URLs generated in block 808.

Returning to block 818, if the content to be replaced is not an attachment, then the process advances to block 820. In block 820, if the original content comprises a web page (i.e., the original content comprises a link to the web page) then the process advances to block 828. In block 828, the custom email handler 116 visits the web page to gather information about the web page. In an example implementation, this comprises crawling the web page to detect what the content of the web page is. In an example implementation, this comprises the custom email handler 116 automatically launching a web browser, navigating to the original URL in the browser, and either or both: caching content of the web page (e.g., by downloading the html file(s), CSS file(s), javascript file(s), and/or other content of the web page) and/or capturing one or more images ("screenshots") of the web page. After block 828, the process advances to block 824. In block 824, the information gleaned from the web page visit (e.g., a copy of web page in plain text format with references/links disabled, a "sandboxed" cache of the web page hosted by the custom email handler 116, and/or screenshots of the web page) is associated with one or more URLs generated in block 808

Returning to block 820, if the original content is not a web page, the process advances to block 822 in which a copy of the original content (e.g., any type of downloadable file, just a few common examples of which are: .gif, .jpeg, .png, .pdf files) is downloaded to the database 124. The downloaded copy is then used as the substitute content (e.g., after a virus scan). After block 822 the process advances to block 824 and one or more URLs generated in block 808 are associated with the copy of the content obtained in block 822.

Figure 8B:
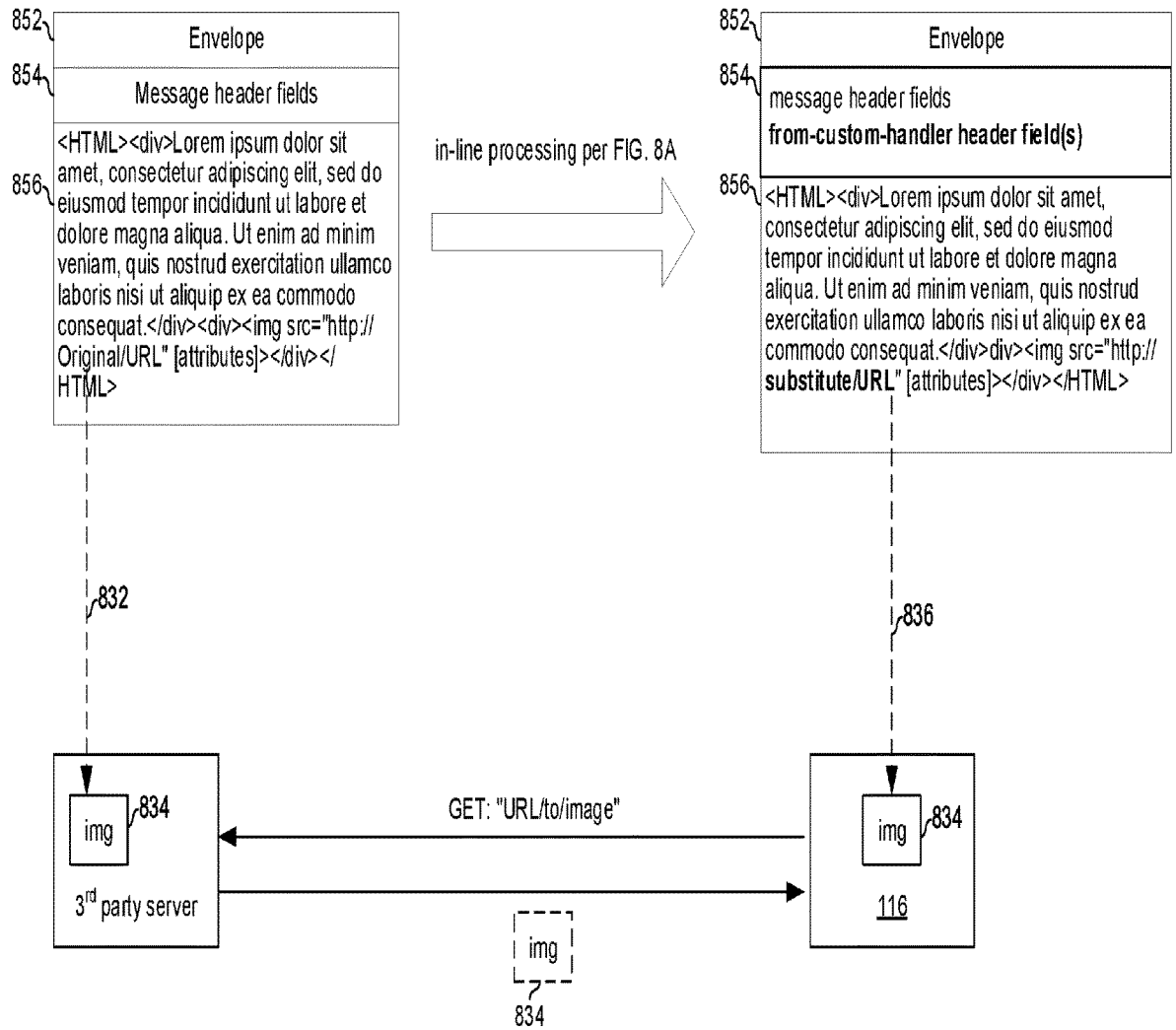
FIG. 8B illustrates an example implementation in which original content comprising an HTML image element is replaced by substitute content comprising a substitute HTML image element.

FIG. 8B illustrates an example implementation in which original content comprising an HTML image element is replaced by substitute content comprising a substitute HTML image element. As shown, after in-line processing per the process of FIG. 8A, from-custom-handler header field(s) have been added to the header fields 854, and the HTML image element having a URL of "http://Original/URL" has been replaced with an HTML image element having a substitute URL of "http://Substitute/URL" in the message body 856. In the example shown, as indicated by arrow 832, the original URL points to an image file 834 stored on a server that is not part of the custom email handler 116. In response to determining to replace the original HTML image element, the custom email handler downloads the image file 834 from the third-party server (e.g., using an http get request as shown). The custom email handler 116 then associates the downloaded copy of the image 834 with the substitute URL as indicated by the arrow 836. In another example implementation, rather than downloading a copy of the image 834, the custom email handler may generate, and store in the database 124, a substitute image file having the same attributes as the image file 834 (e.g., same size and transparency) and the substitute URL may be associated with the substitute image file so that the substitute image file is served in response to a request to the substitute URL.

Figure 8C:
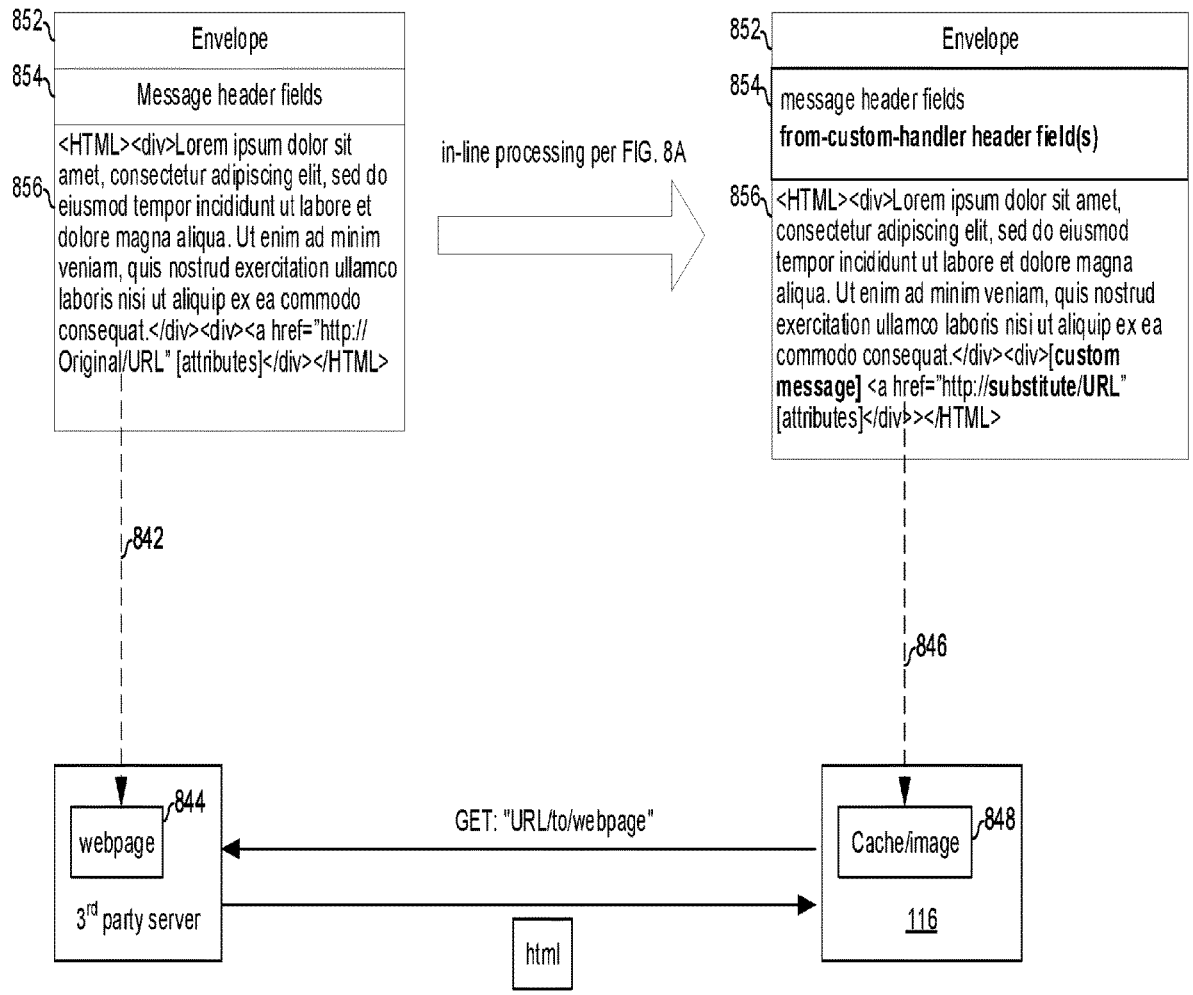
FIG. 8C illustrates an example implementation in which original content comprising a hyperlink to a web page is replaced by a substitute content comprising information about the web page referenced by the original hyperlink.

FIG. 8C illustrates an example implementation in which original content comprising a hyperlink to a web page is replaced by a substitute content comprising information about the web page referenced by the original hyperlink. As shown, after in-line processing per the process of FIG. 8A, from-custom-handler header field(s) have been added to the header fields 854. Also, in the message body 856, the HTML <div> element comprising a hyperlink targeting an original URL of "http://Original/URL" has been replaced with an HTML <div> element having a custom message and a hyperlink targeting a substitute URL of "http://Substitute/URL." In the example shown, as indicated by arrow 842, the original URL points to a web page 844 stored on a server that is not part of the custom email handler 116. In response to determining to replace the original hyperlink, the custom email handler 116 visits the web page 844 and gathers information about the web page (e.g., caches a copy of the web page in the database 124, captures images of the web page, performs a web page to pdf document conversion, and/or the like). In the example shown, the information gathered comprises a cached or imaged version of the web page 844. The custom email handler 116 then associates the cached copy and/or images 848 with the substitute URL as indicated by the arrow 846. The custom message may, for example, explain that the hyperlink targets a substitute URL and give the reason why the hyperlink was replaced. For example, the message may indicate which custom processing rule(s) triggered the replacement (e.g., the message may say that the original URL was replaced because a tracking metric for the original URL was above a determined threshold). The message may, for example, provide the original URL and recommend that, if the recipient wants to follow it, that s/he do so by copy-and-pasting it into a browser in "private" or "incognito" mode. If the recipient follows the substitute hyperlink, the imaged and/or cached version may present a similar message.

Figure 8D:
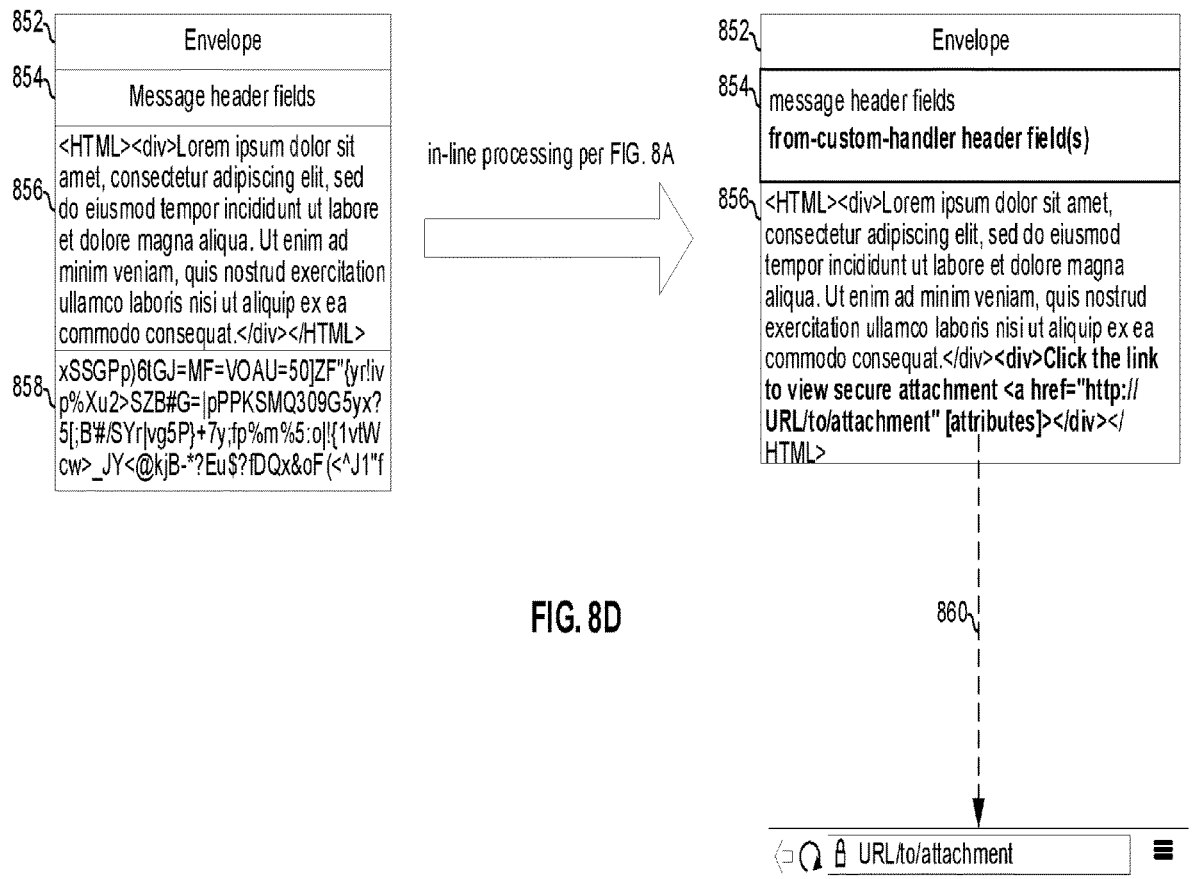
FIG. 8D illustrates an example implementation of the process of FIG. 8A in which an attachment to an email message is removed and a hyperlink to a securely hosted copy of the attachment is inserted into the body of the email message.

FIG. 8D illustrates an example implementation of the process of FIG. 8A in which an attachment to an email message is removed and a hyperlink to a securely hosted copy of the attachment is inserted into the content of the email message. As shown, prior to in-line processing according to the process of FIG. 8A, the message comprises envelope 852, header fields 854, message body 856, and attachment 858. After in-line processing according to the process of FIG. 8A, the attachment 858 has been removed and replaced by a hyperlink in the message body 856. As represented by the dashed line 860, the hyperlink points to the attachment 858 accessible via web server circuitry 122. When clicked by the user, a browser 862 may open and display the content of the attachment 858. As indicated by the lock in the address bar of browser 862, the URL may be a secure URL (e.g., accessible only via https) and the person attempting to view the content may need to provide a previously generated username and password, may need to enter a one-time and/or time-sensitive password sent to the email address to which the message was intended, and/or some other suitable security measure. The replacement of the attachment with the link may, for example, be the result of the email message recipient being subscribed to custom email handler 116 and having a custom processing rule in place that directs all email attachments to be saved to cloud storage (either provided by custom email handler 116 and/or a third-party service) rather than delivered to his/her email client.

Figure 8E:
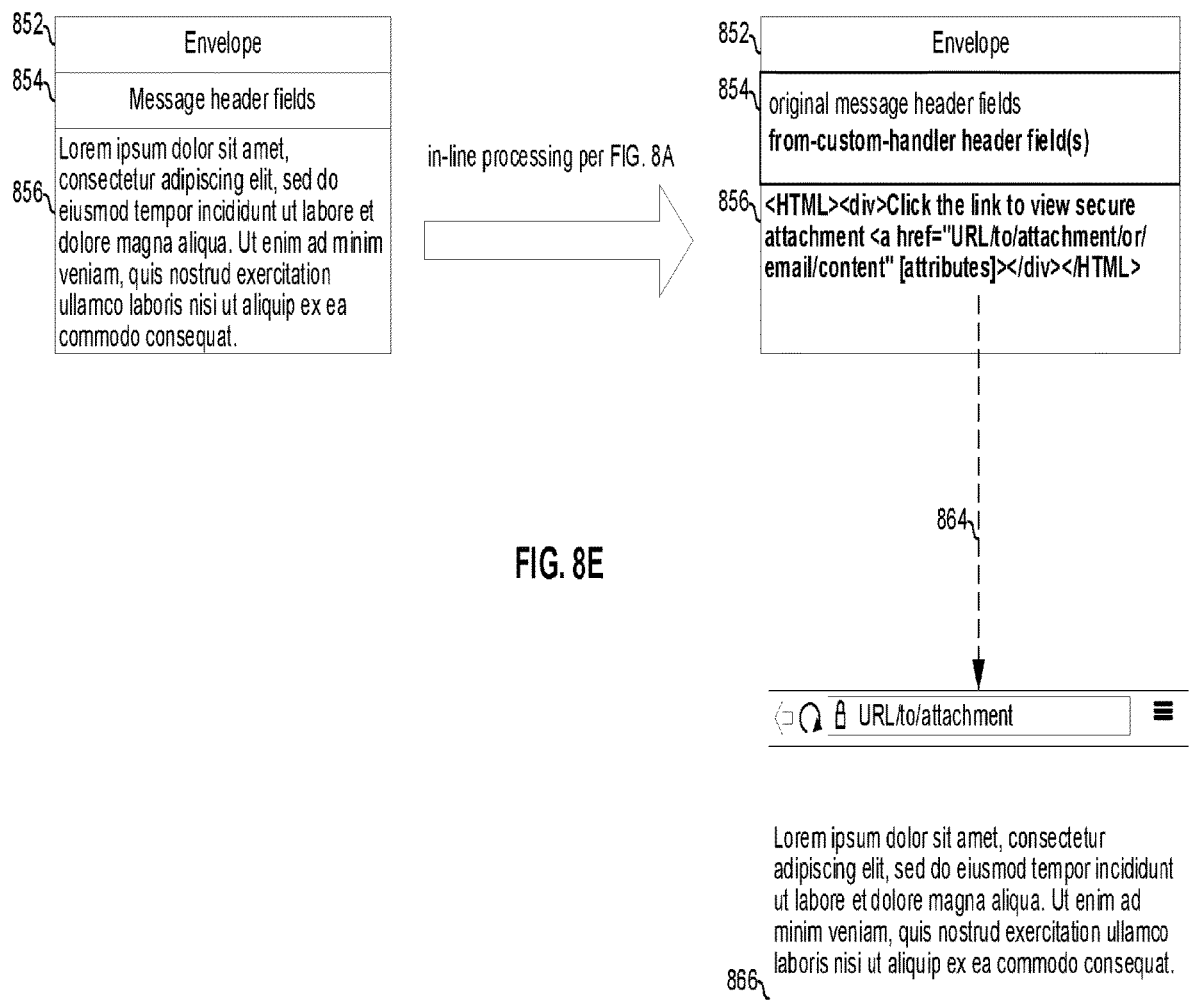
FIG. 8E illustrates an example implementation of the process of FIG. 8A in which plain text formatted content of an email message is removed and a hyperlink to a securely hosted copy of the plain text content is inserted into the content of the email message.

FIG. 8E illustrates an example implementation of the process of FIG. 8A in which plain text formatted content of an email message is removed and a hyperlink to a securely hosted copy of the plain text content is inserted into the content of the email message. As shown, prior to in-line processing according to the process of FIG. 8A, the message comprises envelope 852, header fields 854, and message body 856 containing plan text content. After in-line processing according to the process of FIG. 8A, the plain text content of body 856 has been replaced by a hyperlink. As represented by the dashed line 864, the hyperlink points to the plain text content accessible via web server circuitry 122. When the hyperlink is followed by the recipient, a browser 866 may open and display the text. As indicated by the lock in the address bar of browser 866, the URL may be a secure URL (e.g., accessible only via https) and the person attempting to view the content may need to provide a previously generated username and password, may need to enter a one-time and/or time-sensitive password sent to the email address to which the message was intended, and/or some other suitable security measure. In another example implementation, the content may be converted to an image file (e.g., .gif, .jpeg. etc.) or video file (e.g., .mov, .fly, etc.) or audio file (e.g., .mp3, using text-to-speech), and then targeted in an HTML element (<img>, <video>, <audio> etc.) that the MUA can download and display natively without the user having to click a link and open a browser. In an example implementation, the recipient may configure the custom processing command based on the format that s/he desires (e.g., based on the type of device s/he typically use to view his/her email messages). In an example implementation, the recipient may configure the custom processing rule to have the custom email handler 116 generate multiple images of different sizes and/or formats corresponding to the various devices the recipient uses to read his/her email messages. The email message may then have multiple links indicating which link to use depending on from which device the email message is being accessed.

Similar to FIGS. 8D and 8E, HTML-formatted content (rather than plain text) may be hosted by custom email handler 116 and replaced by a hyperlink. Also, the entire body need not be replaced. It may be that only sensitive text, images, etc. (e.g., containing information protected by HIPAA, social security numbers, and/or the like) are replaced by hyperlinks. For example, a custom processing rule may define criteria (regular expressions, substrings, plain language search terms, Boolean search terns, etc.) for sensitive information (e.g., information protected by HIPAA, social security numbers, financial account numbers, information subject to export control laws, and/or the like), and, upon detecting such information, store the email message content to database 124 and replace it with a secure link in the message body.

Figure 9:
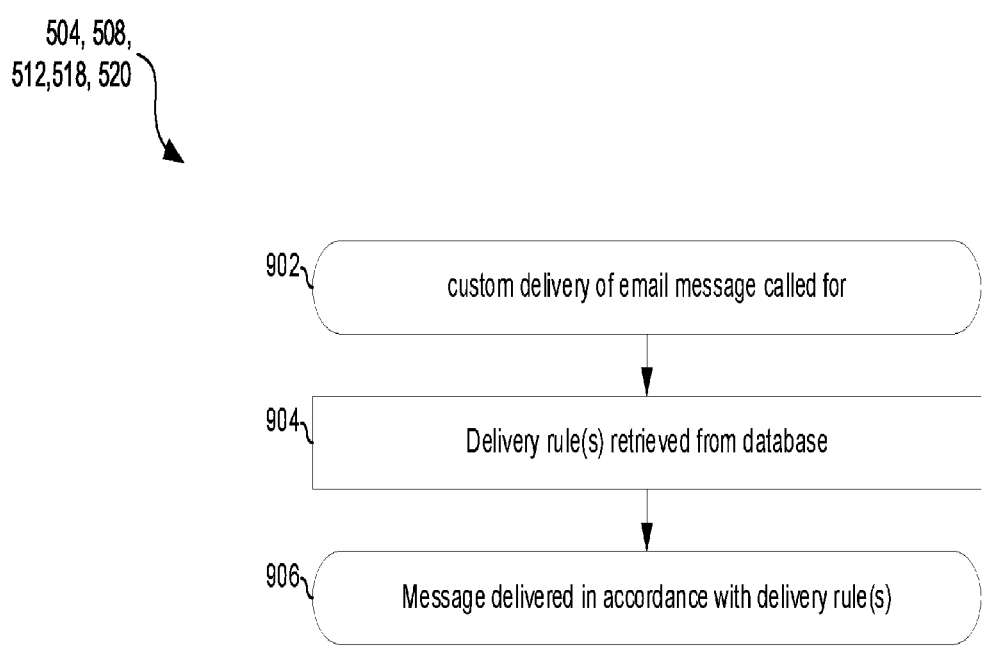
FIG. 9 is a flowchart illustrating an example implementation in which one of the blocks of FIG. 5A calls for the custom email handler to deliver an email message in accordance with a recipient-configured custom email message delivery rule.

FIG. 9 is a flowchart illustrating an example implementation in which one of the blocks of FIG. 5A. In block 902, one of blocks 502, 506, 510, 516, and 520 of FIG. 5A has called for the custom email handler to deliver an email message in accordance with a custom processing rule associated with the email message recipient. In block 904, the delivery rule(s) to be applied to the email message are retrieved from the database 124. Criteria for applying a particular custom delivery rule may be applicable to email messages from (or not from) particular senders, email messages received at particular times, email message comprising particular regular expressions and/or substrings, and/or the like. As an example custom delivery: all email messages to which the rule applies (i.e., meeting particular criteria set forth in the rule) should be held by the custom email handler 116 until a particular day and/or time at which point they are delivered to the recipient's MUA as a group (e.g., each with particular text set forth in the rule inserted into the subject line).

FIG. 10A illustrates an example interface for managing custom processing of email messages by the custom email handler. Shown is an interface 1004 displayed in a browser window 1002. In another example implementation, the interface 1004 may be an HTML-formatted email message. The interface 1004 provides a table of email messages received over a (selectable/filterable) time interval. In the example shown, each row (other than the header row) of the table is associated with a particular email message (or, in some instances, a group of email messages related based on contents of one or more of their envelopes, header fields, and/or message bodies). In the example, each row comprises the following fields:

Date field 1006—shows the date on which the email message (or latest/earliest/median/etc. message for a group of email messages) was received.

Sender field 1008—shows the sender of the email message (or latest/earliest/median/etc. for a group of email messages).

Subject field 1010—shows the body subject header field of the email message (or latest/earliest/median/etc. message for a group of email messages).

Link to original content/message field 1012—holds a hyperlink to the email message (e.g., where the message was blocked completely) or provides a hyperlink to content removed or replaced from the email message. As discussed above with respect to FIG. 8C, the hyperlink may be accompanied by a message advising the user that following the link may cause the user's activity to be tracked.

About sender field 1016—holds information about the sender of the email message (or senders for a group of email messages). This information may be automatically mined by the custom email handler 116. For example, the custom email handler 116 may: visit a website associated with the sender's domain; visit hyperlinks in the email message; analyze previous email messages (and/or their metadata) that were to and/or from the sender; extract the information from, or based on, a custom processing command provided by the sender (as described above with respect to FIG. 5A), and/or the like.

Connectedness metric field 1018—holds a metric value(s) indicating a relation between one or more recipient(s) of the message(s) and the sender(s) and/or other recipient(s) appearing in the envelope and/or header field(s) of the email message(s). An example calculation of the connectedness metric is described below with reference to FIG. 10B.

spam metric field 1020—holds a value indicating the likelihood that the email message is unwanted (i.e., "spam"). The value of the spam metric may be based on, for example: the envelope of the message, the header field(s) of the message, the message body, the presence or absence of custom processing commands (e.g., as described above with reference to FIG. 5A), data from other email messages previously processed by the custom email handler 116, and/or metadata generated for other email messages previously processed by the custom email handler 116 (e.g., whether such email messages have been opened, by whom they've been opened, when they've been opened, whether their images have been downloaded by recipients, whether links in them have been clicked by recipients, etc.).

Add to whitelist field 1022—holds an interface element (e.g., button checkbox, etc.) via which the user can modify how this email message and/or future email messages like it are treated by the custom email handler 116. Although the example shows a simple binary option to allow such email messages through unmodified, other implementations may provide more sophisticated interface elements to configure custom processing rules which were triggered by the email message.

Add to blacklist field 1024—holds an interface element (e.g., button checkbox, etc.) via which the user can modify how this email message and/or future email messages like it are treated by the custom email handler 116. Although the example shows a simple binary option to completely block such email messages, other implementations may provide more sophisticated interface elements to configure custom processing rules which were triggered by the email message.

Links to related email messages field 1026—holds hyperlinks to email messages which the custom email handler 116 has determined are related to the email message(s) that is/are associated with the record. The relation may, for example, be based on the envelope (e.g., common senders and/or recipients), message header fields (e.g., matches in "to", "cc", "bcc," "from," "message-id," "references," and/or "subject" header field(s)), and/or based on the content of the message body. In an example implementation, email messages linked in field 1026 may be limited to email messages which have been opened by the recipient.

Figure 10B:
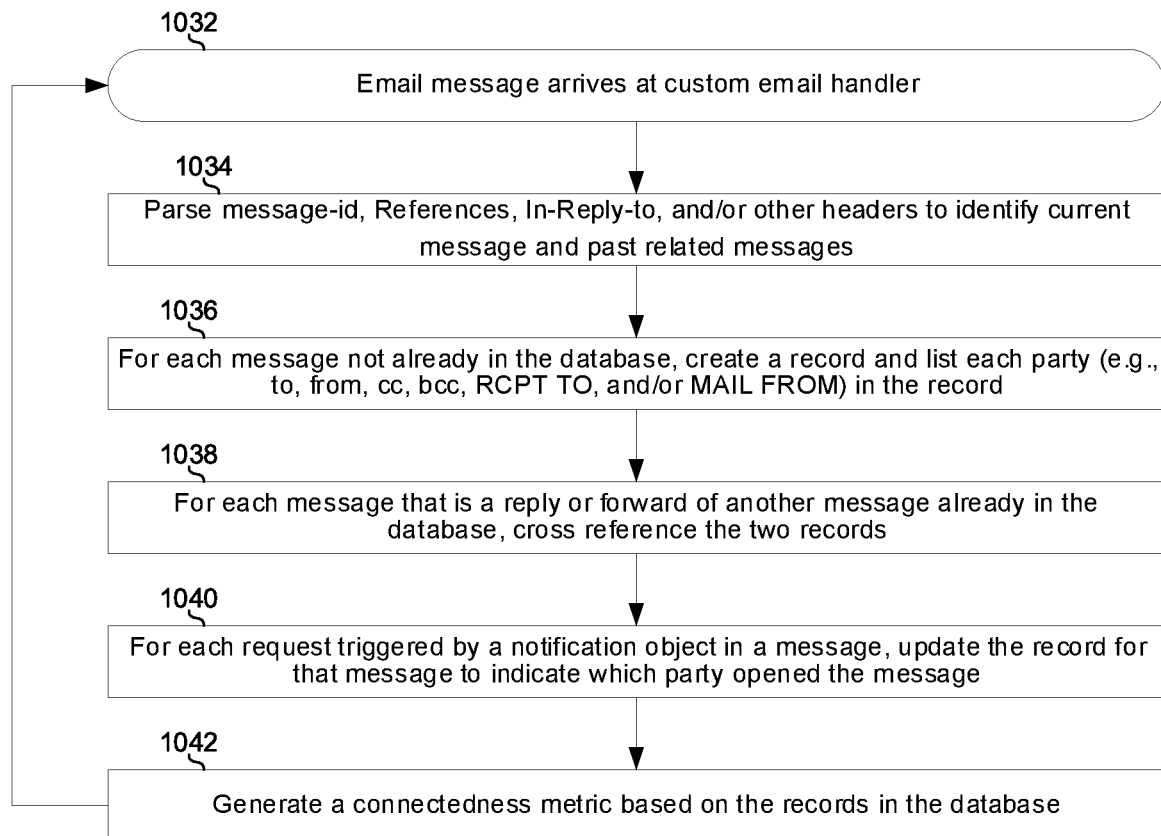
FIG. 10B is a flowchart illustrating an example process for calculating a connectedness metric.
Figure 10C:
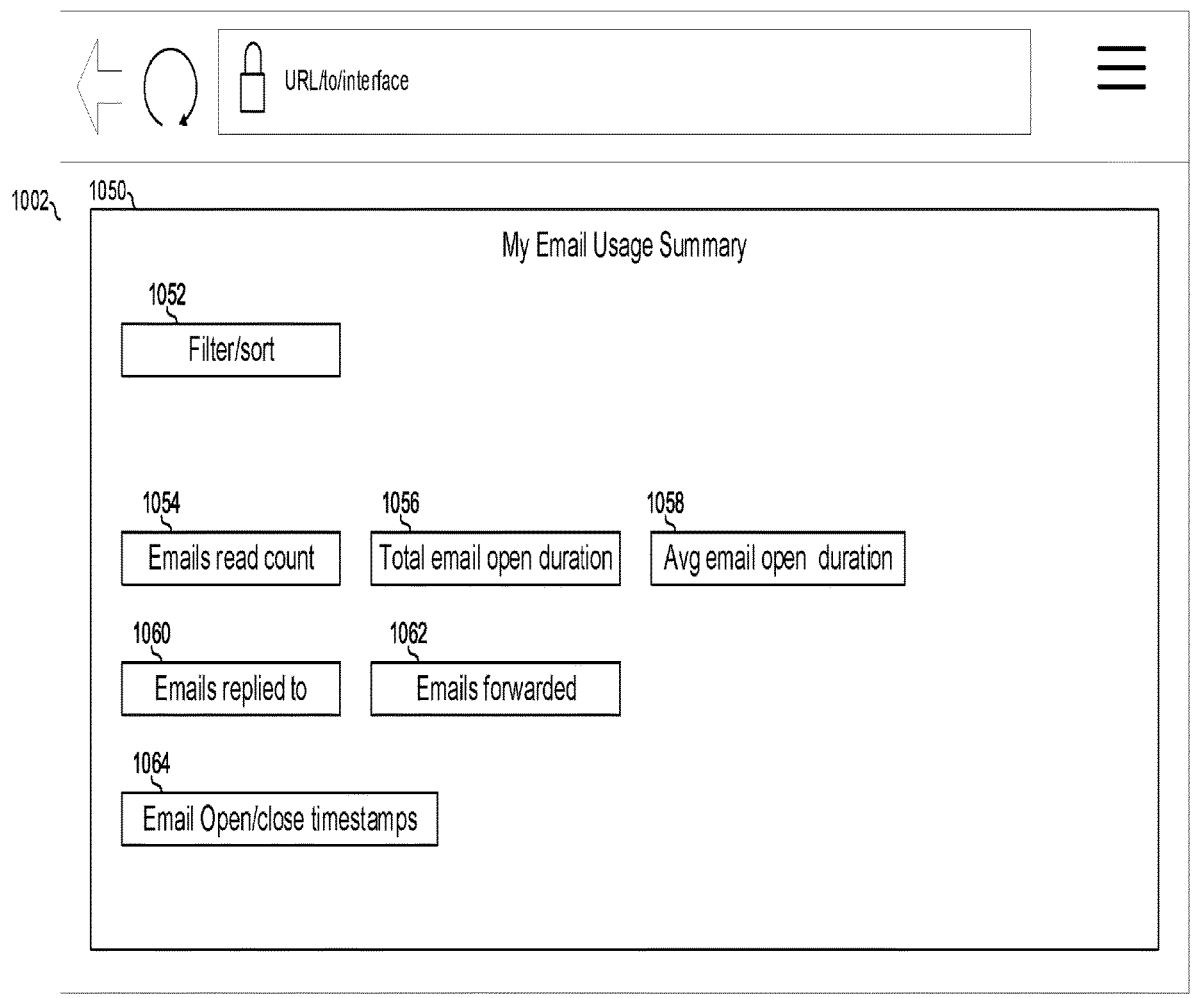
FIG. 10C illustrates an example interface provided by the custom email handler for email usage management.

FIG. 10B is a flowchart illustrating an example process for calculating a connectedness metric. In block 1032, an email message arrives at custom email handler 116. In block 1034, the custom email handler parses the email message to identify other email messages to which it is related. For example, the related other messages may be determined from one or more of: a message-id header, a references header, an in-reply-to header, and/or other headers. In block 1036, for each of the message and the determined related messages not already in the database 124, a record is created in the database 124. Each such record may contain one or more fields to hold each party to the email message(s) (determined from to, from, cc, and bcc headers and/or determined from the SMTP envelope(s)). In block 1038, for each message that is a reply or forward of another message already in the database 124, the two records are linked (e.g., through insertion of foreign keys). In block 1040, for each request received by the web server circuitry 122 to a URL inserted into a message by the custom email handler 116, the custom email handler 116 updates the record in the database 124 for that message to, for example, indicate which party opened the message (and/or increment a count of times the party opened the message, and/or increment a duration for which the party viewed/read the message). In block 1042, the custom email handler 116 generates a connectedness metric based on the records in the database 124. In this manner, the connectedness metric for two parties A and B may be a function of one or more of: number of emails sent from A to B, number of emails sent from B to A, number of opens of emails from A by B, number of opens of emails from B by A, number of replies to emails from A by B, number of replies to emails from B by A, number of opens of emails from a third party C, number times both A and B opened the same email, number of times both A and B replied to the same email, number of times both A and B forwarded the same email, and/or the like FIG. 10C illustrates an example interface provided by the custom email handler 116 for email usage management. The example interface 1050 displayed in browser window 1002 (in another example implementation the interface 1050 is an HTML-formatted email message) comprises the following interface elements:

filter/sort element 1052—an interface element which enables configuring which emails the user wants to see statistics for. Example filtering and sorting criteria include: by user, group of users, date, time, sender address/domain, recipient address/domain, to header field, from header field, cc header field, bcc header field, message-id header field, subject header field, references header field, presence of attachment, size of email message, size of attachment, spam metric, connectedness metric, and/or any other data extracted from email messages and/or metadata stored about email messages.

emails read count element 1054—an interface element showing how many times the email message(s) meeting the filter criteria have been opened. This metric may correspond to the number of requests received by web server circuitry 122 for URLs which were inserted into the email messages by the custom email handler 116 (per custom processing rules established by the recipient him/herself and/or his/her company, domain owner, and/or other authorized party).

total email open duration 1056—an interface element showing total duration for which email message(s) meeting the filter criteria have been open in the recipients MUA. This metric may correspond to the total amount of time the web server circuitry 122 has spent serving responses to requests for URLs which were inserted into the email messages by the custom email handler 116 (e.g., inserted per custom processing rules established by the recipient him/herself and/or his/her company, domain owner, and/or other authorized party). In an example implementation, this may be achieved simply by inserting a URL which targets content that is a large file that takes a long time to download such that the response is being served the entire time the message is being read (up to some cutoff which is, for example, two or more standard deviations above that average read time of an email message). In an example implementation, the size of the content may be chosen based on the length of the text in the image. That is, it may be assumed that a very short email will not likely be read for more than 1 minute and thus content that will complete downloading in about a minute may be used for tracking the read time of such an email message. In another example implementation, the content used for read time tracking may be small but the web server circuitry 122 may throttle the rate at which is serves the content. For example, the web server circuitry 122 may break the content up into P packets and send one of the packets every X seconds, thus permitting a tracking time of up to P*X seconds while using only a very small amount of bandwidth. As another example, the custom email handler 116 may insert N small images such that each image can be served in a single response packet but may insert a delay of X seconds between the response packets such that a read time of up to N*X second can be tracked while using a very small amount of bandwidth.

average email open duration 1058—an interface element showing the average amount of time the email message(s) meeting the filter criteria were open in the recipient's MUA.

emails replied to count 1060—an interface element showing how many of the email message(s) meeting the filter criteria have been replied to by the recipient.

emails forwarded count 1062—an interface element showing how many of the email message(s) meeting the filter criteria have been forwarded by the recipient.

email open timestamps 1064—a list of the times at which the email message(s) meeting the filter criteria were opened and/or closed. In an example implementation, the custom email handler 116 may automatically export this information along with other data extracted from the email messages (e.g., an attorney matter number) to a spreadsheet or third-party timesheet management software.

Figure 11:
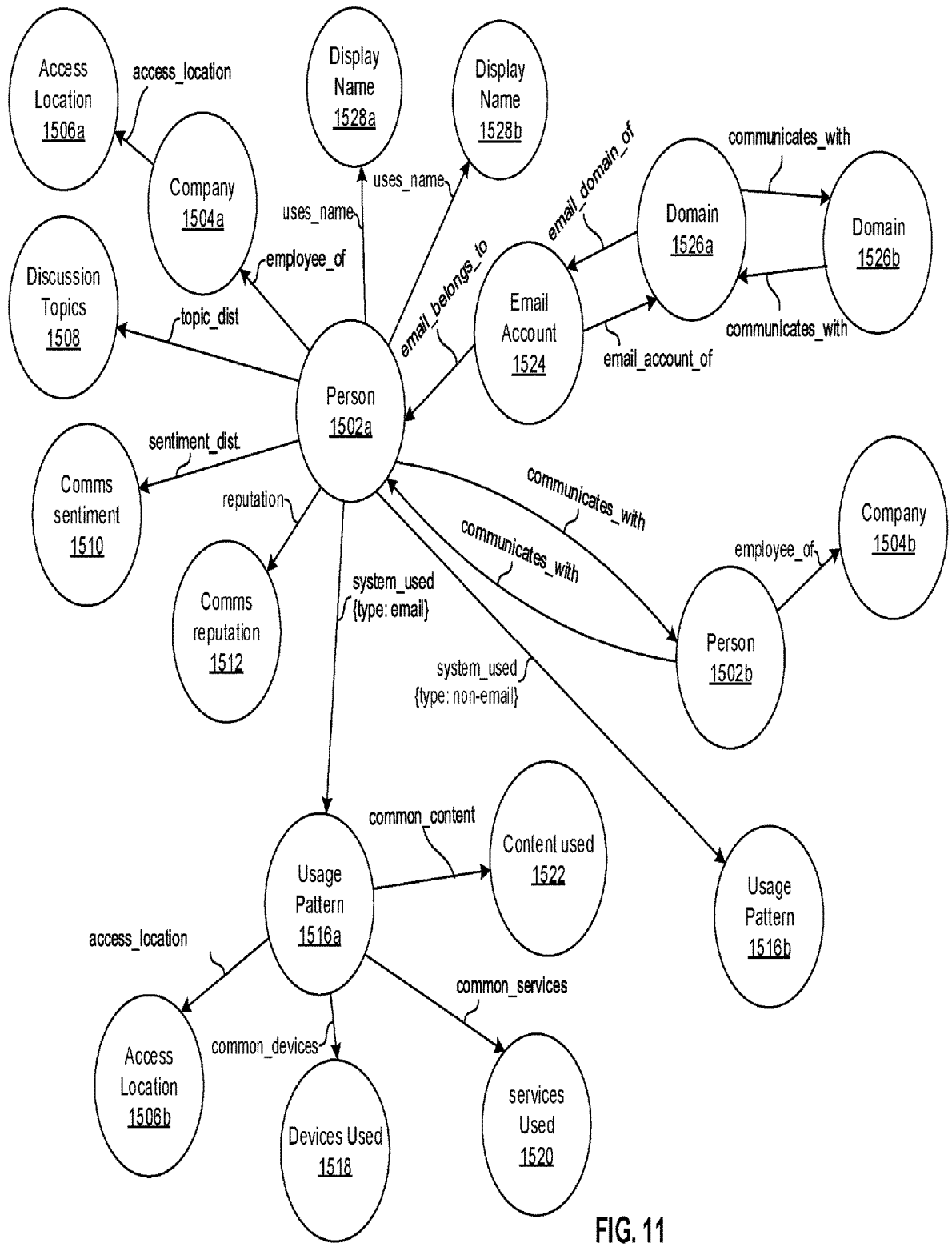
FIG. 11 illustrates an example implementation of a database used by the custom email handler.

FIG. 11 illustrates an example implementation of a database used by the custom email handler. The example database is a graph database comprising multiple types of vertices (representing real-world things) and multiple types of edges (representing relationships between the vertices). A list of example vertices and edges—and properties associated with those vertices and edges—will now be described. In an example implementation, the custom email handler 116 adds vertices, adds edges, and sets properties of the vertices and edges using: (1) data extracted/generated from analyzing email messages that pass through the custom email handler 116; (2) data received as part of web requests for remotely-hosted content linked-to in emails handled by the custom email handler 116; and (3) data received from third-party systems via the third-party interface circuitry 164.

Each Person vertices 1502 represents a person. Example properties of a Person include: an employee identification number, a location (e.g., city), a username (e.g., "john"), and an email address (e.g., "john@acme.com"). For purposes of illustration, two Person vertexes 1502a and 1502b are shown.

The Company vertices 1504 represent non-person entities (Corporation, organization, etc.). Example properties of a company vertex include the company's name. For purposes of illustration, two Company vertexes 1504a and 1504b are shown.

The Access_Location vertices 1506 represent physical locations. Example properties of an Access_Location vertex include latitude, longitude, city, radius (e.g., radius from a defined point that is considered to be part of the same Access_Location), and/or Internet Protocol (IP) Address(es) associated with the Location.

Discussion_Topic vertices 1508 represent topics discussed in email messages and/or messages exchanged on the third-party system. Example properties of a Discussion_Topic vertex include: the topic discussed in a message (e.g., "information security," "Product X", "Company Y", etc.), the frequency with which each topic is discussed, the total number of times the topic has been discussed, and the length of a discussion on the topic (e.g., in numbers of characters, numbers of email messages, etc). In an example implementation, properties of Discussion_Topics are set/updated by analyzing messages using neural topic model (NTM) machine learning algorithms.

Communications_Sentiment vertices 1510 represent emotional states present in communications. Example properties of a Communications_Sentiment vertex include: emotions detected in messages (e.g., "happy,", "stressed," etc.), the frequency with which each emotion is detected, the total number of times the each emotion has been discussed. In an example implementation, communications_sentiment vertices are populated by analyzing messages using sentiment analysis machine learning algorithms.

Communications_Reputation vertices 1512 represent a reputation of a person on one or more communication media. A Person's Communication_Reputation provides an indication of the importance and/or desirability of reading messages from the Person. Example properties of a Communications_Reputation vertex include: email reputation (e.g., a numerical value calculated based on a weighted combination of factors such as how often the Person's emails are opened, deleted without reading, replied-to, marked as junk, etc.) and third-party messaging system (e.g., Slack, Teams, etc.) reputation (e.g., a numerical value calculated based on a weighted combination of factors such as how often the Person's messages are "liked" (or analogous), replied-to, etc.).

Usage_Pattern vertices 1516 represent patterns of usage of any type of computing system (e.g., email, a third-party messaging service, a CRM, etc.). Example properties of a Usage_Pattern vertex include: the name of the system to which the pattern applies, the number of times the Person has used the system, the frequency with which the Person uses the system, the typical duration with which the person uses the system, and the duration of the Person's current session (if any) on the system. For purposes of illustration, two Usage_Pattern vertexes 1516*a* and 1516*b* are shown.

Devices_Used vertices 1518 represent devices used to access computing system. Example properties of a Devices_Used vertex include: the make of the device, model of the device, MAC address, SIM number, and/or other unique identifier of the device, and/or the like. In an example implementation, devices used is determined based on requests for remotely-hosted content received by the custom email handler 116.

Services_Used vertices 1520 represent services used in combination with a System_Used. For example, services used with an email system may include the email host (e.g., Microsoft, Google, an self-hosted Exchange server, etc.), email delivery/tracking services (e.g., MailChimp®, SendGrid®, etc.), email clients (e.g., Outlook®, Gmail®), security services (e.g., Mimecast®, Exhange Online Protection®, etc.) and/or the like. In an example implementation, Services_Used with email are determined by inspecting email headers and tracking objects embedded in email messages (e.g., links to remotely-hosted content).

Content_Used vertices 1522 represent content present in communications. Example properties of a Content_Used vertex include: saluttions_used (e.g., "Hi," "Dear," "sincerely," etc.), signatures_used (e.g. name, telephone numbers, links, logos, and/or the like)

Email_Account vertices 1524 represent email accounts. In an example implementation, Email_Account vertices are added as email addresses are encountered in email messages flowing through the custom email handler 116.

Domain vertices 1526 represent Internet domains. Example properties of a Domain include any fields available in DNS records associated with the name (e.g., MX records, SPF records, DKIM records, CNAME records, etc.). For purposes of illustration, two Domain vertexes 1526*a* and 1526*b* are shown.

Display_Name vertices 1528 represent email display names (the part typically shown in a mail user agent.) In an example implementation, each Display_Name vertex corresponds to a single name (e.g., a first name or a last name). For example, email john@company.com may use the display name "John Doe" and may be associated with a "John" Display_Name vertex and a "Doe" Display_Name vertex. For purposes of illustration, two Display_Name vertexes 1528*a* and 1528*b* are shown.

Employee_Of edges indicate relationships between person vertices and company vertices.

Access_Location edges indicate relationships between Access_Location vertices and other vertices such as Company vertices and Usage_Pattern vertices.

Topic_Distribution edges indicate relationships between Discussion_Topic vertices and other vertices such as Person vertices.

Sentiment_Distribution edges indicate relationships between Communications_Sentiment vertices and other vertices such as Person vertices.

Reputation edges indicate relationships between Communication_Reputation vertices and other vertices such as Person vertices.

System_Used edges indicate relationships between Usage_Pattern vertices and other vertices such as Person vertices. Example properties of a Systems_Used vertex include the type of system (e.g., "email," "Slack®, etc.)

Access_Location edges indicate relationships between Access_Location vertices and other vertices such as Usage_Pattern vertices and Company vertices.

Common_Device edges indicate relationships between Device vertices and other vertices such as Usage_Pattern vertices.

Common_Service edges indicate relationships between Services_Used vertices and other vertices such as Usage_Pattern vertices.

Common_Content edges indicate relationships between Content_Used vertices and other vertices such as Usage_Pattern vertices.

Communicates_With edges indicate relationships between Person vertices and other Person vertices. Example properties of a Communicates_With edge include: count of communications (over some determined time period), frequency of communications, time distribution of communications, system of communication (e.g., email, Slack, etc.), and a timestamp of the last communication.

Email_Belongs_To edges indicate relationships between Email_Account vertices and Person vertices.

Email_Account_Of edges indicate relationships between Email_Account vertices and Domain vertices.

Email_Domain_Of edges indicate relationships between Domain vertices and Email_Account vertices.

Uses Name edges indicate relationships between Person vertices and Display_Name vertices.

Figure 12A:
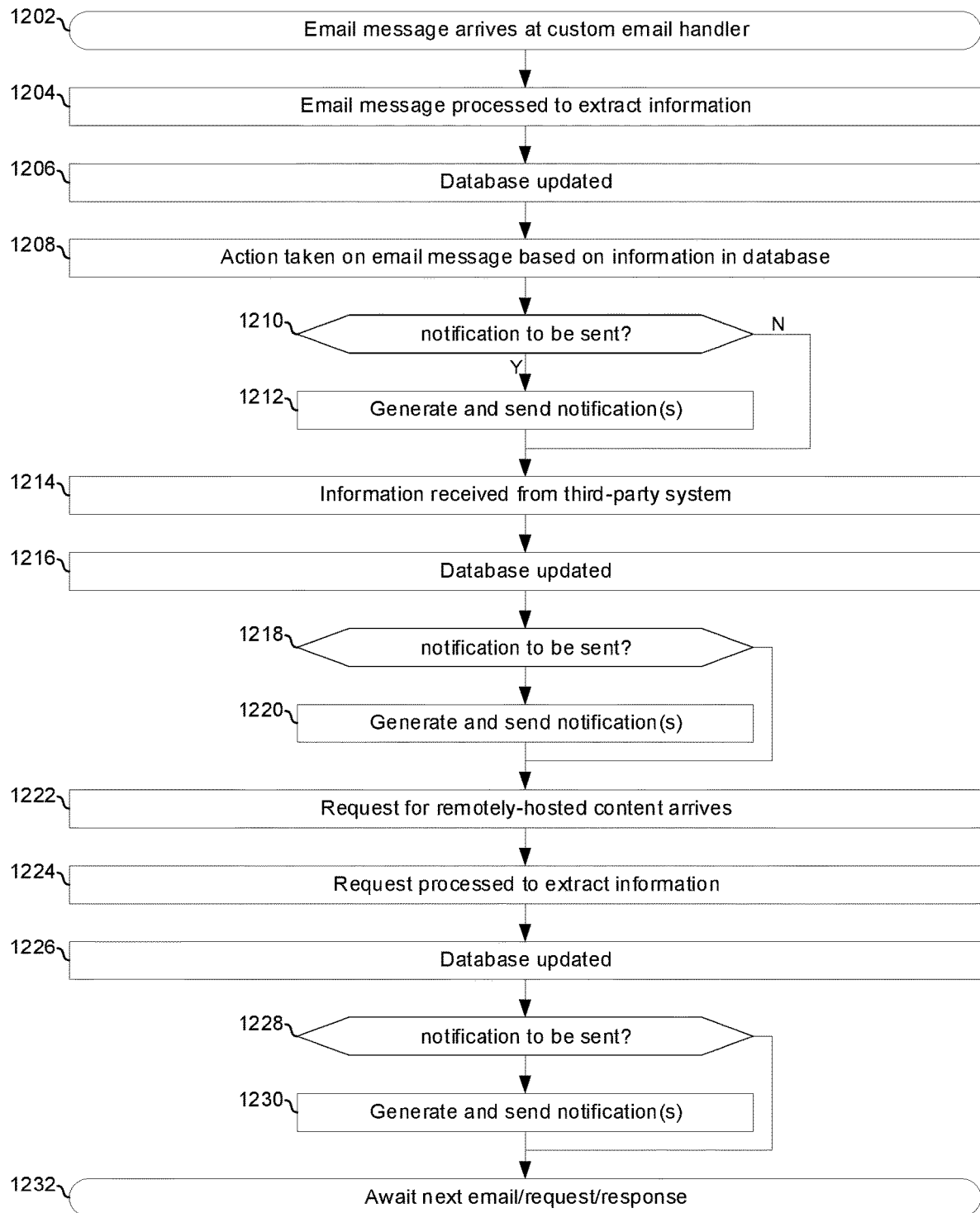
FIGS. 12A and 12B illustrate an example process of handling email and generating notifications using a database such as the one in FIG. 11.
Figure 12B:
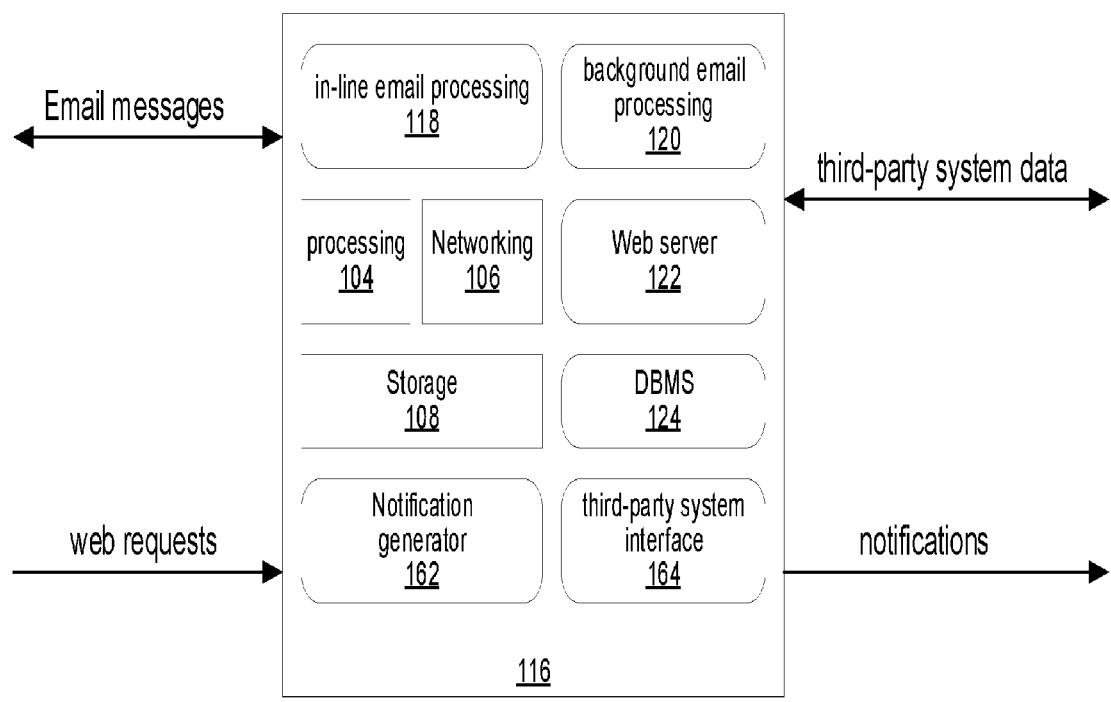

FIGS. 12A and 12B illustrate an example process of handing email and generating notifications using a database such as the one in FIG. 11. Inputs and outputs of the process of FIG. 12A are shown in FIG. 12B. Specifically, in an example implementation, inputs include email messages, data from the third-party system 160 and web requests (e.g., requests from MUAs for remotely-hosted content; outputs include email messages, data to the third-party system 160, and notifications.

The process begins with block 1202 in which an email message arrives at the custom email handler 116.

In block 1204 the email message is processed by the custom email handler to extract information. This may comprise, analyzing the email message using one or more machine learning algorithms to extract information from the email message.

In block 1206 the information extracted from the email message is used to update the database in the form of creating one or more new vertices, creating one or more new edges, and/or updating one or more properties of one or more existing edges and/or vertices.

In block 1208, action is taken on the email message based on the information that was extracted from it and based on the information in the database. Example actions include dropping the message (i.e. not delivering it), delaying its delivery (e.g., until after work hours), delivering it to a junk or spam folder, delivering it to an inbox folder, inserting some content into the email message before delivering it, redirecting it to a different recipient than is listed in the envelope, and/or the like. An example in which the action taken is to insert information into the body of the email message is described below with reference to FIG. 13

In block 1210, the notification generation circuitry 162 determines whether a notification is to be generated based on the information extracted from the email and/or contents of the database. If a notification is to be sent, then the process advances to block 1212.

In block 1212, the notification is sent. The notification may, for example, be in the form of an email, a request to the third-party system, an SMS message, and/or the like.

In block 1214 information is received from the third-party system 160.

In block 1216 the information received in block 1214 is used to update the database in the form of creating one or more new vertices, creating one or more new edges, and/or updating one or more properties of one or more existing edges and/or vertices.

In block 1218, the notification generation circuitry 162 determines whether a notification is to be generated based on the received information and/or contents of the database. If a notification is to be sent, then the process advances to block 1220.

In block 1220, the notification is sent. The notification may, for example, be in the form of an email, a request to the third-party system, an SMS message, and/or the like.

In block 1222, a request for remotely-hosted content is received by the custom email handler 116. The request may be the result of the custom email handler embedding a link to remotely-hosted content in an email message.

In block 1224, the request is processed to extract information from it (e.g., sender IP Address, services used, software used on the requesting device, time of request, IP address from which etc.)

In block 1226, the information extracted from the request is used to update the database in the form of creating one or more new vertices, creating one or more new edges, and/or updating one or more properties of one or more existing edges and/or vertices.

In block 1228, the notification generation circuitry 162 determines whether a notification is to be generated based on the received information and/or contents of the database. If a notification is to be sent, then the process advances to block 1230.

In block 1230, the notification is sent. The notification may, for example, be in the form of an email, a request to the third-party system, an SMS message, and/or the like.

In block 1232 the custom email handler 116 awaits the next email message, web request, or exchange with the third-party system 160.

As an example of a notification that may be generated in block(s) 1212, 1220, and/or 1230, a "potentially compromised account" notification may be generated upon detection of two of a Person's accounts on two Systems_Used (e.g., email and Slack®) accounts) being concurrently accessed from two different Access_Locations (e.g., an SMS message to the Person and/or an information security team). As another example, a "potentially compromised account" notification may be generated upon detection of a Person's account on a Systems_Used being accessed from a location that is not an Access_Location previously present in that Person's Usage_Pattern for that system. As another example, a "potential impersonation" notification may be generated upon detecting an email message from an Email_Account of a Person where the message uses content not in the Common_Content of that Person's email Usage_Pattern. As another example, a "potential impersonation" notification may be generated upon detecting an email message from an email using a particular Display_Name but that is not from a Person associated with that Display_Name. As another example, a "potential impersonation" notification may be generated upon detecting a first Person attempting to send an email to a second Person that the first Person has communicated with fewer that some threshold number of times or has not frequently communicated with. As another example, a "potential phishing" notification may be generated upon detecting an email address with a newly-registered domain or that is associated with an IP addresses known to be used for Phishing. If a notification is to be sent, the process advances to block 1212. Otherwise the process advances to block 1214.

In an example implementation, a notification sent to the third-party system may comprise an instruction to disable access to a user account, or terminate all sessions for a user account, on the third-party system based on a detection that the account may have been compromised (e.g., because the account and an email account associated with the same Person vertex were accessed from two different locations at the same time).

In an example implementation, the custom email handler may disable access to an email account, or terminate/logout all sessions associated with an email account (i.e. require re-authentication) on a detection that the email account may have been compromised (e.g., because the account and an email account associated with the same Person vertex were accessed from two different locations at the same time).

In an example implementation, information received from the third-party system may comprise a notification that the third-party system suspects an user account on the third-party system, has been compromised. In response the custom email handler may find any email accounts associated with the third-party system account and disable access to the email account(s) and/or terminate all sessions associated with the email account(s) (i.e., require re-authentication).

Figure 13:
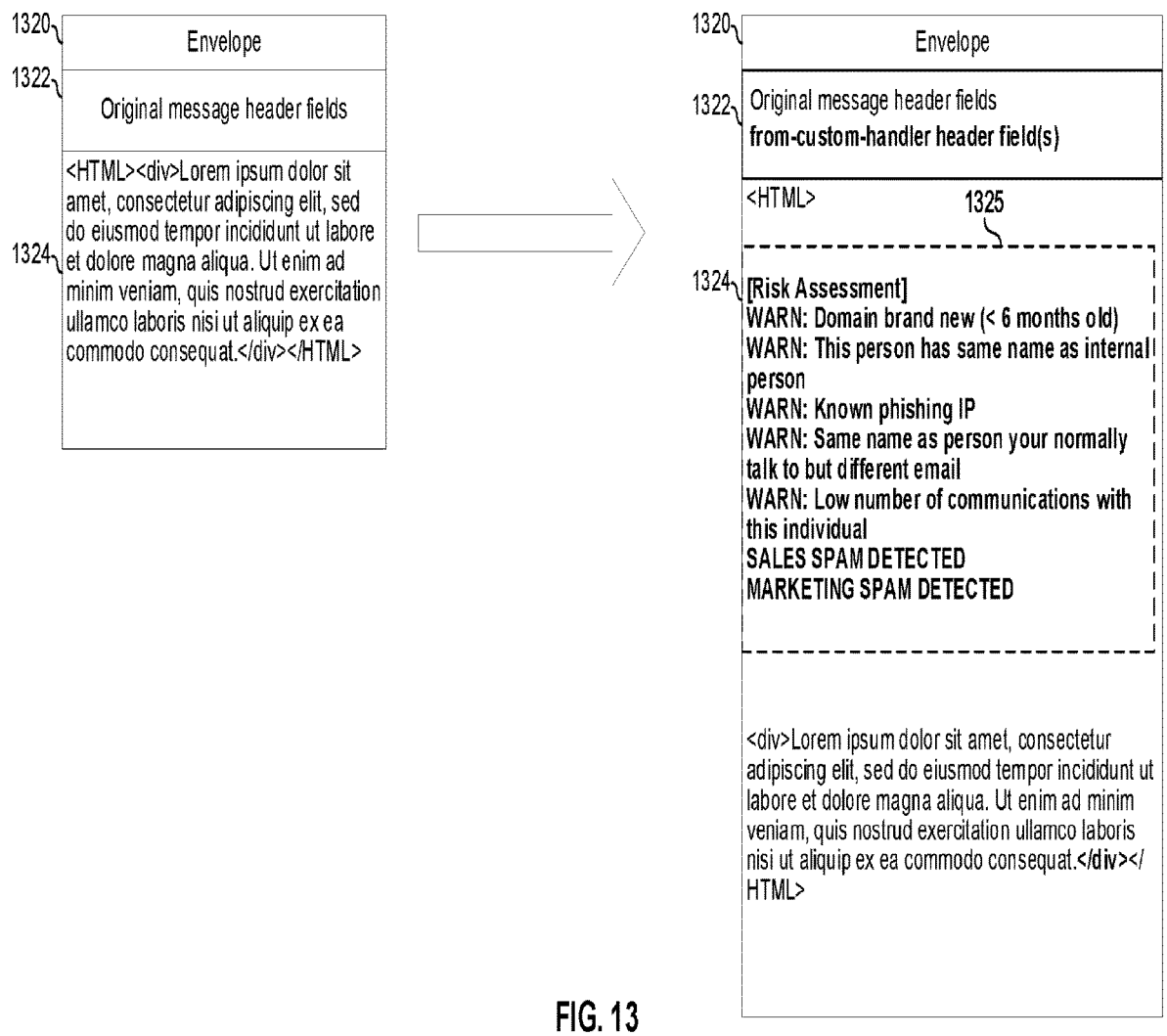
FIG. 13 depicts an example email message modified by the custom email handler based on relationships among entities associated with the email message.

FIG. 13 depicts an example email message modified by the custom email handler based on relationships among entities associated with the email message. Upon arriving at the custom email handler 116, the email message comprises an envelope 1320*m* headers 1322, and body 1324. The custom email handler 116 analyzes the email message with reference to the database 124 (e.g., having the schema shown in FIG. 11) and, based on the analysis, determines to insert a risk assessment 1324 into the body of the email message (e.g., above the original text of the email message). The risk assessment may comprise text and/or images.

In the example shown, the risk assessment 1324 warns the recipient that domain of the sender was registered less than 6 months ago (which may be a sign that it was newly registered for sending spam or phishing emails). The registration date of the domain may be a property of the Domain entity in the database.

In the example shown, the risk assessment 1324 warns the recipient the email address has the same Display_Name as a Person in the recipient's Company, but that this email is not associated with that Person (i.e., a possible spoofing/impersonation warning).

In the example shown, the risk assessment 1324 warns the recipient that the email came from an IP address associated with previous phishing attempts (which may be a property of a Domain entity associated with the email).

In the example shown, the risk assessment 1324 warns the recipient the email address has the same Display_Name as a Person that the recipient regularly exchanges emails with, but that this email has a different Email_Address not associated with that Person (i.e., a possible spoofing/impersonation warning).

In the example shown, the risk assessment 1324 warns the recipient that the email message came from an Email_Address with which the recipient has had fewer than some threshold number of previous communications.

In the example shown, the risk assessment 1324 warns the recipient that this email may be sales or marketing spam (e.g., based on a Services_Used entity associated with the sender or domain.)

In accordance with an example implementation of this disclosure, a system comprising email processing circuitry (e.g., 118 and 120), web server circuitry (e.g., 122), third-party interface circuitry (e.g., 164), and a database, wherein the database stores information about a plurality of users (e.g., as shown in the example implementation of the database 124 of FIG. 11). The email processing circuitry is operable to receive, via a network, a first email message and generate a modified first email message by insertion of a link to remotely-hosted content in the received email message (e.g., as shown in FIG. 6C). The email processing circuitry is operable to transmit, via a network interface, the modified first email message. The web server circuitry is operable to receive, via a network, a request for the remotely-hosted content, and update the database based on information contained in the request for the remotely-hosted content (e.g., create one or more vertices, create one or more edges, and/or update one or more properties of one or more vertices and/or edges). The third-party interface circuitry is operable to receive, via a network, information about activity on a third-party system, and update the database based on the information about activity on the third-party system. The email processing circuitry is further operable to receive a second email message, determine an action to take on the second email message based on information stored in the database (e.g., based on vertices associated with the sender, vertices associated with the recipient, and/or relationships between vertices associated with the sender and vertices associated with the recipient), and perform the determined action on the second email message. The determined action may comprise one or more of: insertion of text into the body of the second email message (e.g., a risk assessment such as shown in FIG. 13), deletion of the second email message, delaying delivery of the second email message, redirection of the second email message, delivery of the second email message to a quarantine, delivery of the second email message to a spam folder, and delivery of the second email message to an inbox. The update of the database based on information contained in the request for the remotely-hosted content may comprise an update of one or more access locations associated with one or more of the plurality of users (e.g. creating a new Access_Location vertex and a new Access_Location edge between the Access_Location vertex and an email system Usage_Pattern vertex that is a used_system of a Person that is a recipient of the email message in which the link to the remotely-hosted content was embedded). The update of the database based on the information about activity on a third-party system may comprise an update of one or more access locations associated with one or more of the plurality of users (e.g. creating a new Access_Location vertex and a new Access_Location edge between the Access_Location vertex and a third-party system Usage_Pattern vertex that is a used_system of a Person that was the recipient of the email message in which the link to the remotely-hosted content was embedded). The determined action may be based on one or more access locations associated in the database with a sender and/or recipient of the second email message. The system may comprise notification circuitry operable to detect that a third-party system account associated with a sender or recipient of the second email message was accessed from a suspicious location (e.g., a location that is not an Access_Location of a Person vertex corresponding to the sender or recipient), and take the determined action on the second email address based on the detection that the third-party system account was accessed from a suspicious location. The notification generation circuitry may be operable to generate an alert email message based on one or more access locations associated in the database with a sender and/or recipient of the first email message. The notification circuitry may operable to detect that the first email message was accessed from a suspicious location (e.g., a location that is not an Access_Location of a Person vertex corresponding to the sender or recipient) and generate the alert based on the detection. The update of the database based on information contained in the request for the remotely-hosted content may comprise an update of one or more relationships associated with one or more of the plurality of users (e.g., add a new edge connected to a Person vertex corresponding to the one of the plurality of users and/or update properties of an existing edge connected to a Person vertex corresponding to the one of the plurality of users and/or update properties of a relationship edge). The update of the database based the information about activity on the third-party system may comprise an update of one or more relationships associated with one or more of the plurality of users (e.g., add a new relationship edge connected to a Person vertex corresponding to the one of the plurality of users and/or update properties of a relationship edge connected to a Person vertex corresponding to the one of the plurality of users and/or update properties of a relationship edge). The determined action may be based on one or more relationships associated in the database with a sender of the second email message and/or a recipient of the second email message (e.g., based on Communicates_With relationships connected to the Person vertices corresponding to the sender and the recipient). The one or more relationships may identify people or domains to which the sender and/or recipient of the second email message previously sent a message on the third-party system (e.g., Communicates_With edges having system type of "third-party system"). The one or more relationships may identify people or domains from which the sender and/or recipient of the second email message previously received a message on the third-party system (e.g., Communicates_With edges having system type of "third-party system"). The notification generation circuitry may be operable to generate an alert email message based on one or more relationships associated in the database with a sender and/or a recipient of the second email message (e.g., edges connected (or not) to Person vertex/vertices corresponding to the sender and/or recipient). The one or more relationships may identify one or both of people or domains to which the sender and/or recipient of the second email message previously sent an email message, (e.g., Communicates_With edges having system type of "email"). The one or more relationships may identify people or domains from which the sender and/or recipient of the second email message previously received an email message (e.g., Communicates_With edges having system type of "email"). The notification generation circuitry may be operable to detect, based on the information contained in the request for the remotely-hosted content and the information about activity on the third-party system, that an email account associated with one of the plurality of users (e.g., a Used_System of type "email" for a Person vertex corresponding to the one of the plurality of users) and a messaging system account associated with the one of the plurality of users (e.g., a Used_System of type "third-party system" for a Person vertex corresponding to the one of the plurality of users) are or were accessed from different locations within a determined time period, and generate an alert message in response to the detection. The third-party system interface circuitry may be operable to send a command to the third-party system to restrict access of one of the plurality of users on the third-party system in response to detection of suspicious activity on an email account associated with the one of the plurality of users. The email processing circuitry may be operable to restrict access to an email account associated with one of the plurality of users in response to receiving, via the third-party system interface, a notice of suspicious activity on a third-party system account associated with the one of the plurality of users. The third-party system may be a non-email messaging system (e.g., SMS, Slack®, Teams®, and/or the like).

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. The machine-readable medium may be accessible via a network (e.g., the Internet) such that when the code is downloaded and installed on local machines, the local machines are configured into a system as described in this disclosure, and when the code is executed by such system, the system performs processes described in this disclosure.

While the present method and/or system has been described with reference to certain implementations, it will be understood by those skilled in the art that various changes may be made and equivalents may be substituted without departing from the scope of the present method and/or system. In addition, many modifications (e.g., re-ordering of flowchart blocks) may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system, comprising:
   email processing circuitry, web server circuitry, third-party interface circuitry, and a database, wherein:
   the database stores information about a plurality of users;
   the email processing circuitry is operable to:
     receive, via a network, a first email message;
     generate a modified first email message; and
     transmit, via a network interface, the modified first email message;
   the web server circuitry is operable to:
     receive, via a network, a request for content of the modified first email message; and
     update the database based on information contained in the request for the content;
   the third-party interface circuitry is operable to:
     receive, via a network, information about activity on a third-party system; and
     update the database based on the information about activity on the third-party system.

2. The system of claim 1, wherein the content includes remotely-hosted content.

3. The system of claim 1, wherein generation of a modified first email message further comprises insertion of a link to remotely-hosted content in the first email message.

4. The system of claim 1, wherein, if the content to be inserted comprises remotely-hosted content, the email processing circuitry calculates a uniform resource locator (URL) for such content.

5. The system of claim 4, wherein the URL is based on the envelope, header field(s), message body, spam metric, and/or connectedness metric of, or associated with, the message.

6. The system of claim 4, wherein the URL includes one or more of: a hash of a recipient's domain, a hash of the recipient's email address; a hash of the body of the message-id header field; a random generator number that is unique to this the URL, or a value corresponding to the body of the message-id header filed encrypted with a security key that is associated with the recipient or the recipient's domain in the database.

7. The system of claim 1, wherein the email processing circuitry is further operable to generate text-based content to be included in the message body of the first email message.

8. The system of claim 7, wherein the text-based content is plain text or HTML.

9. The system of claim 1, wherein the email processing circuitry is further operable to authenticate the first email message.

10. The system of claim 9, wherein the authentication is based on one or more fields of an envelope of the first email message, one or more of header fields of the first email message, or a body of the first email message.

11. The system of claim 1, wherein the email processing circuitry is further operable to process the first email message to extract information therefrom.

12. The system of claim 11, wherein processing further comprises analyzing the first email message using one or more machine learning algorithms.

13. The system of claim 12, wherein the information extracted from the email message is used to update the database in the form of creating one or more new vertices, creating one or more new edges, and/or updating one or more properties of one or more existing edges and/or vertices.

14. The system of claim 13, further comprising notification generation circuitry that is operable to determine whether a notification is to be generated based on the information extracted from the email and/or contents of the database.

15. The system of claim 1, the email processing circuitry is further operable to: receive a second email message; determine an action to take on the second email message based on information stored in the database; and perform the determined action on the second email message.

16. The system of claim 15, wherein the determined action comprises one or more of:
insertion of text into the body of the second email message;
deletion of the second email message;
delaying delivery of the second email message;
redirection of the second email message;
delivery of the second email message to a quarantine;
delivery of the second email message to a spam folder; and
delivery of the second email message to an inbox.

17. The system of claim 15, wherein: the update of the database based on information contained in the request for the content may comprise an update of one or more access locations associated with one or more of the plurality of users; and
the update of the database based on information about activity contained on the third-party system comprises an update of one or more relationships associated with one or more of the plurality of users.

18. The system of claim 17, wherein the determined action is based on one or more relationships associated in the database with a sender of the second email message and/or a recipient of the second email message.

* * * * *

UNITED STATES PATENT AND TRADEMARK OFFICE
CERTIFICATE OF CORRECTION

PATENT NO. : 11,595,353 B2
APPLICATION NO. : 17/206474
DATED : February 28, 2023
INVENTOR(S) : Everton It is certified that error appears in the above-identified patent and that said Letters Patent is hereby corrected as shown below:

In the Claims

At Column 32, Claim number 6, Line number 43, please delete "this"

Signed and Sealed this
Second Day of May, 2023

*Katherine Kelly Vidal*

Katherine Kelly Vidal
*Director of the United States Patent and Trademark Office*